(12) United States Patent
Ogawa et al.

(10) Patent No.: US 11,511,359 B2
(45) Date of Patent: Nov. 29, 2022

(54) DRILL AND METHOD OF MANUFACTURING MACHINED PRODUCT

(71) Applicant: KYOCERA Corporation, Kyoto (JP)

(72) Inventors: Hiroshi Ogawa, Omihachiman (JP); Satoshi Tetsukawa, Omihachiman (JP)

(73) Assignee: KYOCERA CORPORATION, Kyoto (JP)

( * ) Notice: Subject to any disclaimer, the term of this patent is extended or adjusted under 35 U.S.C. 154(b) by 117 days.

(21) Appl. No.: 17/042,560

(22) PCT Filed: Mar. 27, 2019

(86) PCT No.: PCT/JP2019/013281
§ 371 (c)(1),
(2) Date: Sep. 28, 2020

(87) PCT Pub. No.: WO2019/189415
PCT Pub. Date: Oct. 3, 2019

(65) Prior Publication Data
US 2021/0205899 A1    Jul. 8, 2021

(30) Foreign Application Priority Data

Mar. 28, 2018  (JP) .............................. JP2018-062227

(51) Int. Cl.
B23B 51/02    (2006.01)
(52) U.S. Cl.
CPC .......... B23B 51/02 (2013.01); *B23B 2251/14* (2013.01); *B23B 2251/204* (2013.01); *B23B 2251/40* (2013.01)

(58) Field of Classification Search
CPC ................ B23B 51/02; B23B 2251/14; B23B 2251/204; B23B 2251/40;
(Continued)

(56) References Cited

U.S. PATENT DOCUMENTS

| | | | | |
|---|---|---|---|---|
| 1,407,546 A | * | 2/1922 | Joseph | ..................... B23B 51/02 408/230 |
| 5,011,342 A | * | 4/1991 | Hsu | ......................... B23B 51/02 408/230 |

(Continued)

FOREIGN PATENT DOCUMENTS

| | | | |
|---|---|---|---|
| EP | 0278288 A1 | * | 1/1988 |
| JP | 04-502884 A | | 5/1992 |

(Continued)

*Primary Examiner* — Eric A. Gates
*Assistant Examiner* — Paul M Janeski
(74) *Attorney, Agent, or Firm* — Volpe Koenig

(57) ABSTRACT

A drill may include a body extending from a first end toward a second end, and the body may include an outer peripheral surface and a cutting edge. The cutting edge may include a first cutting edge and a second cutting edge. The second cutting edge may be positioned closer to the second end and the outer peripheral surface than the first cutting edge. The second cutting edge may include a first part, a second part and a third part. The second part may be positioned closer to the outer peripheral surface than the first part and may be positioned closer to the second end as close to the first part. The third part may be positioned closer to the first cutting edge than the first part and may be positioned closer to the second end as close to the first part.

21 Claims, 20 Drawing Sheets

(58) Field of Classification Search
CPC .......... B23B 2251/085; B23B 2251/48; B23B 2251/18; B23B 2251/08
See application file for complete search history.

(56) References Cited

U.S. PATENT DOCUMENTS

| | | | |
|---|---|---|---|
| 8,157,028 B2* | 4/2012 | Kersten | B23B 51/02 |
| | | | 175/428 |
| 2008/0199268 A1* | 8/2008 | Krenzer | B23B 51/02 |
| | | | 408/230 |
| 2012/0201619 A1 | 8/2012 | Olsson | |
| 2013/0136552 A1* | 5/2013 | Ono | B23B 51/009 |
| | | | 408/1 R |
| 2017/0274461 A1 | 9/2017 | Mabuchi et al. | |
| 2017/0341159 A1 | 11/2017 | Ogawa | |

FOREIGN PATENT DOCUMENTS

| | | |
|---|---|---|
| JP | 2002-527247 A | 8/2002 |
| JP | 2007-050477 A | 3/2007 |
| JP | 2012-161912 A | 8/2012 |
| JP | 2017-024158 A | 2/2017 |
| WO | 89/08520 A1 | 9/1989 |
| WO | 00/21704 A1 | 4/2000 |
| WO | 2016/047803 A1 | 3/2016 |
| WO | 2016/063893 A1 | 4/2016 |

\* cited by examiner

DRILL AND METHOD OF MANUFACTURING MACHINED PRODUCT

CROSS-REFERENCE TO RELATED APPLICATIONS

This application is a national stage entry according to 35 U.S.C. 371 of PCT Application No. PCT/JP2019/013281, filed on Mar. 27, 2019, which claims priority to Japanese Application No. 2018-062227, filed on Mar. 28, 2018, which are entirely incorporated herein by reference.

TECHNICAL FIELD

The present aspect relates to a drill and a method of manufacturing a machined product.

BACKGROUND ART

As a rotary tool used to perform milling on a workpiece, for example, a drill is disclosed in WO 2016/047803 (Patent Document 1). The drill discussed in Patent Document 1 may include a first tip cutting edge, a second tip cutting edge and a ridge line. The first tip cutting edge may extend from the side of the axis toward the outer side in the radial direction orthogonal to the axis. The second tip cutting edge may be positioned closer to the outer side in the radial direction than the first tip cutting edge. The ridge line may connect the first tip cutting edge and the second tip cutting edge.

In the drill discussed in Patent Document 1, the ridge line and the second tip cutting edge may be connected at an angle. Therefore, during machining, stress may be likely to be concentrated on the connection portion between the ridge line and the second tip cutting edge, and the connection portion may be broken.

SUMMARY OF INVENTION

A drill according to a non-limiting aspect may include a body having a rod-shape and extending along a rotation axis from a first end toward a second end. The body may include an outer peripheral surface, a cutting edge and a flute. The cutting edge may be positioned on a side of the first end. The flute may extend from the cutting edge toward the second end. The cutting edge may include a first cutting edge and a second cutting edge. The first cutting edge may extend from a side of the rotation axis toward the outer peripheral surface. The second cutting edge may be positioned closer to the second end and the outer peripheral surface than the first cutting edge. An end portion of the first cutting edge on a side of the outer peripheral surface may be positioned closer to the second end than an end portion of the first cutting edge on the side of the rotation axis. The second cutting edge may include a first part, a second part and a third part. The first part may be positioned closest to the second end. The second part may be connected to the first part, may be positioned closer to the outer peripheral surface than the first part, and may be positioned closer to the second end as close to the first part. The third part may be connected to the first part, may be positioned closer to the first cutting edge than the first part, and may be positioned closer to the second end as close to the first part. The first part may have a concave curved shape recessed toward the second end in a side view.

DESCRIPTION OF EMBODIMENTS

Hereinafter, a rotary tool according to non-limiting embodiments will be described in detail with reference to the drawings. Specifically, a drill as a non-limiting example of a rotary tool will be described in detail with reference to the drawings. In addition to the drill, non-limiting examples of the rotary tool may include an end mill and a reamer or the like. Accordingly, the drill described below may be replaced with a rotary tool such as an end mill.

In addition, in each of the drawings referred to below, for convenience of description, only main members among members constituting the non-limiting embodiment may be illustrated in a simplified manner. Accordingly, the drill may include any constituent member not illustrated in each drawing to which the present specification refers. Further, the dimensions of the members in each of the drawings may not faithfully represent the actual dimensions of the constituent members and the dimension ratios of each of the members.

Figure 1:
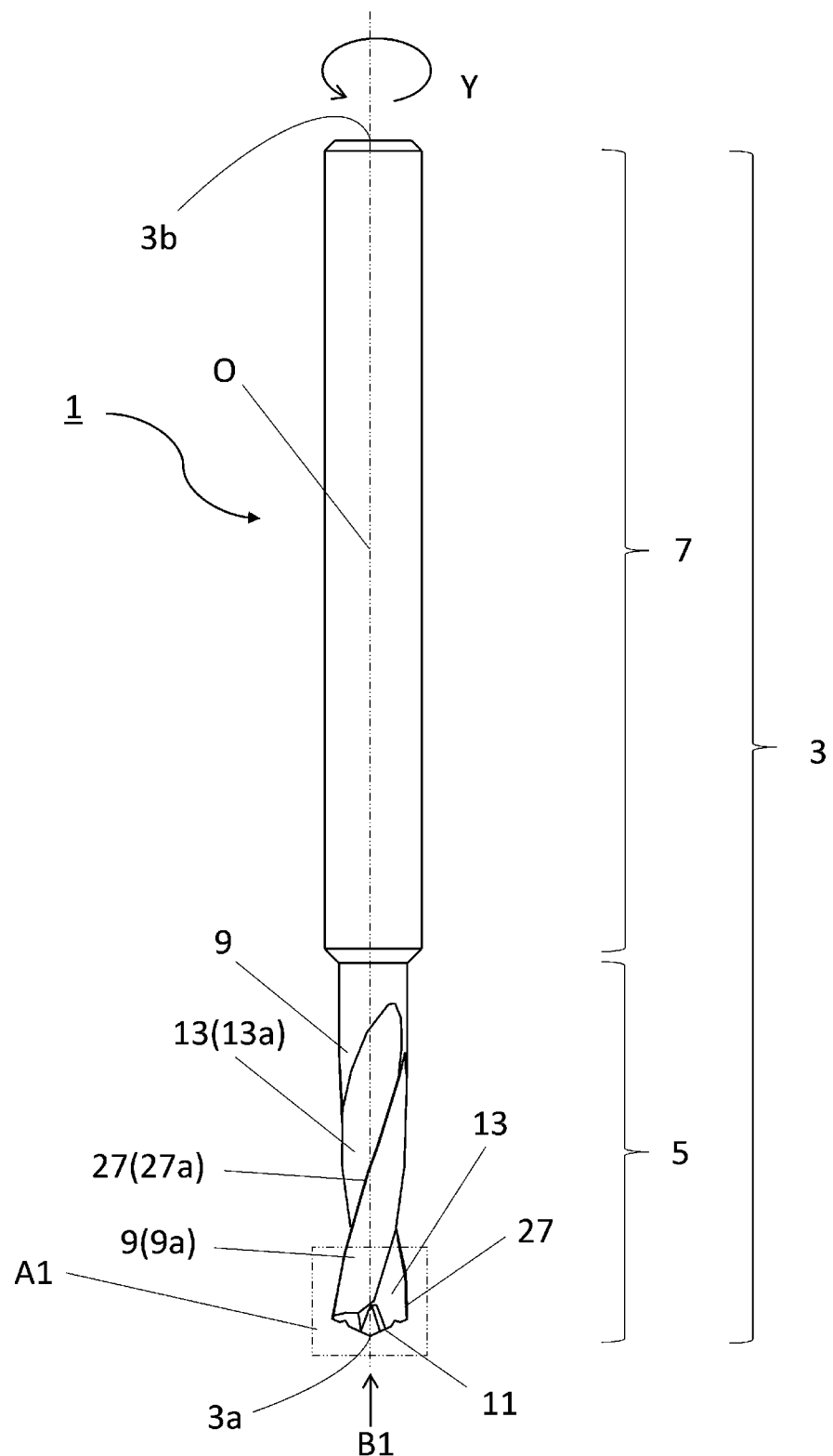
FIG. 1 is a side view illustrating a drill in a non-limiting example of the present disclosure.

FIGS. 3 to 6 may be enlarged views of a portion corresponding to the region A1 in FIG. 1, respectively. Additionally, FIGS. 8 to 12 may be front views from the direction corresponding to the direction B1 illustrated in FIG. 1, respectively.

A drill 1 according to a non-limiting embodiment of the present disclosure may have a body 3 having a rod-shape and extending along a rotation axis O from a first end 3a toward a second end 3b, as in an non-limiting example illustrated in FIG. 1. The body 3 having a rod-shape may be rotatable about the rotation axis O as the center in a direction of an arrow Y as illustrated in FIG. 1 during machining of a workpiece for manufacturing a machined product.

As in the non-limiting example illustrated in FIG. 1, the lower end portion of the body 3 may be the first end 3a, and the upper end portion may be the second end 3b. In general, the first end 3a may also be called a front end, and the second end 3b may also be called a rear end. In the following, the front end 3a and the rear end 3b may be used.

The outer diameter of the body 3 of the non-limiting embodiment can be set to, for example, 4 mm to 25 mm. When the length in the direction along the rotation axis O is L and the outer diameter is D, in the body 3 of the non-limiting embodiment, the relationship between L and D can be set to, for example, L=4D to 15D.

In the non-limiting example illustrated in FIG. 1, the body 3 may include a machining section 5 positioned on the side of the front end 3a and a shank section 7 positioned closer to the side of the rear end 3b than the machining section 5. The machining section 5 may include a portion that comes into contact with the workpiece, and this portion may play a main role in machining the workpiece. The shank section 7 may be a portion gripped by a rotating spindle or the like in a machine tool and may be a portion designed according to the shape of the spindle. Non-limiting examples of the shape of the shank section 7 may include a straight shank; a long shank; and a long neck and tapered shank.

In the non-limiting example illustrated in FIG. 1, the body 3 may include an outer peripheral surface 9, a cutting edge 11, and a flute 13. The outer peripheral surface 9 may be positioned on the outer side from the front end 3a to the rear end 3b of the body 3. The cutting edge 11 may be positioned on the side of the front end 3a in the body 3. Since the cutting edge 11 is generally called a tip cutting edge, the cutting edge 11 may be referred to as a tip cutting edge 11 in the following description. The flute 13 may extend from the tip cutting edge 11 toward the side of the rear end 3b.

As in the non-limiting example illustrated in FIG. 1, the outer peripheral surface 9 may be a surface region in the body 3, that is farthest from the rotation axis O, and the distance from the rotation axis O may be substantially constant. The flute 13 may extend linearly or may extend in a twisted manner from the tip cutting edge 11 toward the rear end 3b. In the non-limiting example illustrated in FIG. 1, the flute 13 may extend from the tip cutting edge 11 toward the rear end 3b in a twisted manner around the rotation axis O.

Note that "extending in a twisted manner" may mean that the flute 13 extends in a substantially twisted manner from the tip cutting edge 11 toward the side of the rear end 3b. Therefore, the flute 13 may have a partially untwisted portion. When the flute 13 extends in a twisted manner, the helix angle of the flute 13 is not limited to a specific value and may be set to, for example, about from 3 to 45°.

Figure 2:
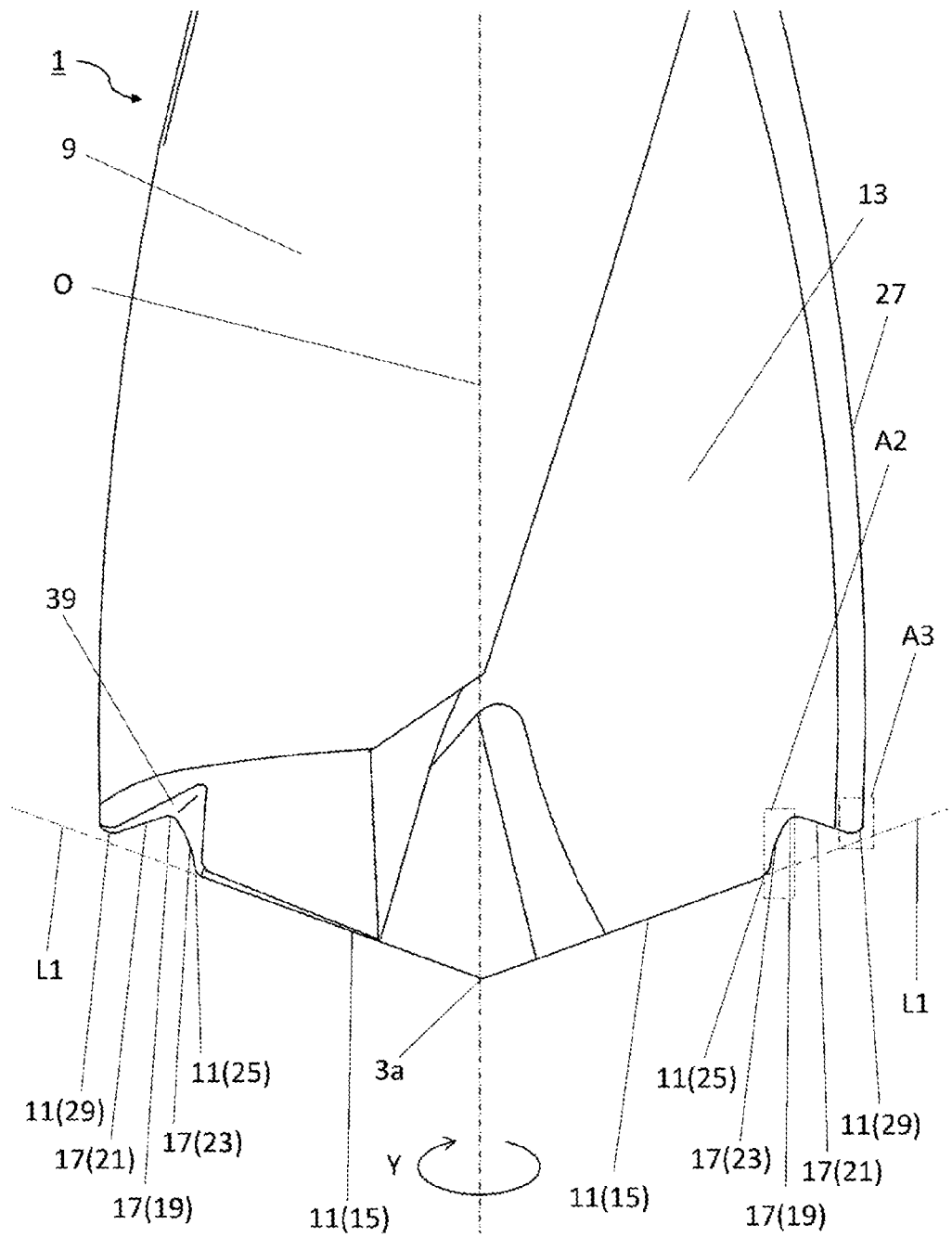
FIG. 2 is an enlarged view of a region A1 illustrated in FIG. 1.

As illustrated in FIG. 2, the tip cutting edge 11 according to the present disclosure may include a first cutting edge 15 extending from the side of the rotation axis O toward the side of the outer peripheral surface 9. In other words, the tip cutting edge 11 may include the first cutting edge 15 extending in a direction away from the side of the rotation axis O. At this time, an end portion of the first cutting edge 15 on the side of the outer peripheral surface 9 may be positioned closer to the side of the rear end 3b than an end portion of the first cutting edge 15 on the side of the rotation axis O.

Further, the tip cutting edge 11 according to the present disclosure may include a second cutting edge 17 positioned closer to the side of the outer peripheral surface 9 than the first cutting edge 15. At this time, the second cutting edge 17 may be positioned closer to the side of the rear end 3b than the first cutting edge 15. As in the non-limiting example illustrated in FIG. 2, an end portion of the second cutting edge 17 on the side of the rotation axis O may be positioned closer to the side of the outer peripheral surface 9 than the end portion of the first cutting edge 15 on the side of the outer peripheral surface 9.

Note that "the second cutting edge 17 may be positioned closer to the side of the outer peripheral surface 9 than the first cutting edge 15" means that the second cutting edge 17 may be, as a whole, positioned on the side of the outer peripheral surface 9 with respect to the first cutting edge 15. Therefore, as in the non-limiting example illustrated in FIG. 6, the end portion of the second cutting edge 17 on the side of the rotation axis O may be positioned closer to the side of the rotation axis O than the end portion of the first cutting edge 15 on the side of the outer peripheral surface 9. Even in such an aspect, it can be said that the second cutting edge 17 is positioned as a whole on the side of the outer peripheral surface 9 with respect to the first cutting edge 15.

Figure 6:
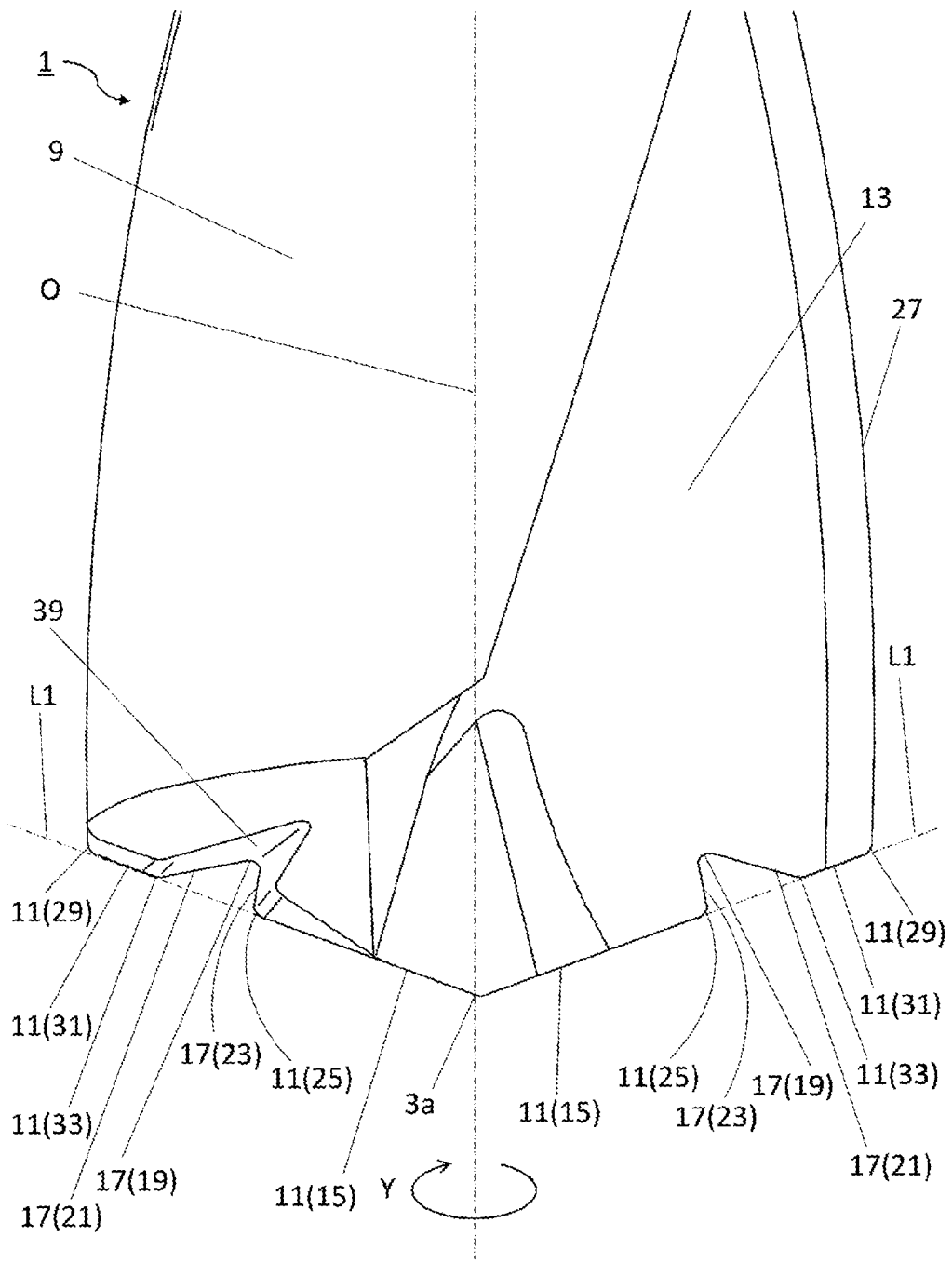
FIG. 6 is an enlarged view illustrating a drill of a non-limiting example of the present disclosure.

As in the non-limiting example illustrated in FIG. 6, the end portion of the first cutting edge 15 on the side of the rotation axis O may be positioned closer to the rotation axis O than the end portion of the second cutting edge 17 on the side of the rotation axis O. Further, an end portion of the second cutting edge 17 on the side of the outer peripheral surface 9 may be positioned closer to the side of the outer peripheral surface 9 than the end portion of the first cutting edge 15 on the side of the outer peripheral surface 9.

For example, when viewed from the side, the first cutting edge 15 may have a concave curved shape or may have a linear shape as illustrated in FIG. 2 or the like. Note that the above-described "when viewed from the side" may mean a case where the target portion is viewed from the front forward in a rotating direction. Therefore, in the description of the first cutting edge 15 when viewed from the side, the first cutting edge 15 may be viewed from the front forward in the rotating direction.

The second cutting edge 17 in the present disclosure may include a first part 19, a second part 21, and a third part 23. For example, as illustrated in FIG. 2, the second cutting edge 17 may include a first part 19, a second part 21, and a third part 23.

The first part 19 may be a portion including a region, in the second cutting edge 17, positioned closest to the side of the rear end 3b. That is, the first part 19 may be positioned closest to the side of the rear end 3b. The first part 19 in the non-limiting example illustrated in FIG. 2 may have a concave curved shape recessed toward the side of the second end 3b, specifically, toward the upper side in FIG. 2. The second part 21 may be positioned closer to the side of the outer peripheral surface 9 than the first part 19 and connected to the first part 19. The third part 23 may be positioned closer to the side of the first cutting edge 15 than the first part 19 and connected to the first part 19.

In addition, the second part 21 in the non-limiting example illustrated in FIG. 2 may approach the side of the front end 3a with increasing distance from the first part 19. In other words, the second part 21 may approach the side of the rear end 3b with decreasing distance to the first part 19.

The third part 23 may also approach the side of the front end 3a with increasing distance from the first part 19. In other words, the third part 23 may approach the side of the rear end 3b with decreasing distance to the first part 19.

Due to the above-described configuration, the drill 1 according to the present disclosure may have good machining accuracy.

In general, the tip cutting edge of a drill may extend from the side of the rotation axis toward the side of the outer peripheral surface, and the end portion on the side of the outer peripheral surface may be positioned closer to the side of the rear end than the end portion on the side of the rotation axis. Therefore, during machining, a radial load may be generated in a direction from the rotation axis toward the outer peripheral surface (radially outward). For example, during drilling, a workpiece may be machined while being pressed and widened radially outward by a radial load. Therefore, after drilling, the diameter reduction phenomenon of the machined hole may occur, and the inner diameter accuracy of the machined hole may be likely to decrease.

The drill 1 according to the present disclosure may include the second part 21 that extends from the side of the rotation axis O toward the side of the outer peripheral surface 9 and that has an end portion on the side of the outer peripheral surface 9 positioned closer to the side of the front end 3a than an end portion on the side of the rotation axis O.

In this case, since a force is generated in a direction from the outer peripheral surface 9 toward the rotation axis O (radially inward) during machining, a radial load directed radially outward can be partially canceled. Therefore, for example, during drilling, the diameter reduction phenomenon of the machined hole may be suppressed, and the inner diameter accuracy of the machined hole may be less likely to decrease. Therefore, the drill 1 according to the present disclosure may have good machining accuracy.

In the drill 1 of the present disclosure, the first part 19 may have a concave curved shape recessed toward the side of the rear end 3b. When the first part 19 connecting the second part 21 and the third part 23 has a concave curved shape recessed toward the side of the rear end 3b, stress may be less likely to be concentrated on a specific portion of the first part 19. Therefore, the drill 1 according to the present disclosure may have high durability. When viewed from the side, the first part 19 may have, for example, an arc shape with a constant radius of curvature.

When viewed from the side, the second part 21 may have, for example, a gently concave curved shape or a linear shape. In a case where the second part 21 has a gently concave curved shape with a radius of curvature larger than the radius of curvature of the first part 19 having a concave curved shape, a portion where the radius of curvature changes in a region from the first part 19 to the second part 21 may be set as a boundary between the first part 19 and the second part 21.

Further, in a case where the second part 21 is linear, a portion where the second cutting edge 17 changes from a concave curved shape to a linear shape in a region from the first part 19 to the second part 21 may be set as a boundary between the first part 19 and the second part 21.

In a case where the second part 21 is linear when viewed from the side as in the non-limiting example illustrated in FIG. 2, the length of the second part 21 that comes into contact with the workpiece during machining may be short, and thus the machining resistance may be small. Accordingly, in the drill 1 in the non-limiting example illustrated in FIG. 2 or the like, chatter vibration may be less likely to occur.

The third part 23 when viewed from the side may have, for example, a gently concave curved shape or a linear shape. When the third part 23 has a concave curved shape when viewed from the side, it may be possible to suppress the occurrence of delamination in the initial stage of drilling.

For example, in the initial stage of drilling, in a stage when the first cutting edge 15 and the third part 23 are in contact with the workpiece while the first part 19 is not in contact with the workpiece, the inclination angle of the third part 23 with respect to the rotation axis O may be small when the third part 23 has a curved shape as compared with the case where the third part 23 has a linear shape. Therefore, the occurrence of delamination in the workpiece can be suppressed.

In a case where the third part 23 has a gently concave curved shape having a radius of curvature larger than the radius of curvature of the first part 19 having a concave curved shape, a portion where the radius of curvature changes in a region from the first part 19 to the third part 23 may be set as a boundary between the first part 19 and the third part 23. In addition, when the third part 23 is linear, a portion where the second cutting edge 17 changes from a concave curved shape to a linear shape in a region from the first part 19 to the third part 23 may be set as a boundary between the first part 19 and the third part 23.

In addition, when the body 3 is viewed from the side as in the non-limiting example illustrated in FIG. 6, an end portion of the third part 23 on the side of the rear end 3b may be positioned closer to the side of the rotation axis O than an end portion of the third part 23 on the side of the front end 3a. When the third part 23 has the above-described configuration, at least a portion of the third part 23 may not be involved in machining.

The tip cutting edge 11 may further include a third cutting edge 25 connected to the first cutting edge 15 and the third part 23. For example, the third cutting edge 25 may have a linear configuration inclined with respect to the first cutting edge 15 and the third part 23 when viewed from the side or may have a curved configuration. In the non-limiting example illustrated in FIG. 2 or the like, the third cutting edge 25 may have a convex curved shape. It may mean that the third cutting edge 25 is convex from the side of the rotation axis O toward the side of the outer peripheral surface 9.

For example, in a case where the third cutting edge 25 has a convex curved shape and each of the first cutting edge 15 and the third part 23 has a linear shape, a portion where the tip cutting edge 11 changes from a linear shape to a convex curved shape in a region from the first cutting edge 15 to the third cutting edge 25 may be set as a boundary between the first cutting edge 15 and the third cutting edge 25. Further, a portion where the tip cutting edge 11 changes from a convex curved shape to a linear shape in a region from the third cutting edge 25 to the third part 23 may be set as a boundary between the third cutting edge 25 and the third part 23.

When the tip cutting edge 11 includes the third cutting edge 25, stress may be less likely to be concentrated on a specific portion of the tip cutting edge 11 in a region from the first cutting edge 15 to the third part 23. Therefore, damage such as chipping may be less likely to occur in the tip cutting edge 11, and the durability of the drill 1 may be high.

The third cutting edge 25 may be a portion connecting the first cutting edge 15 and the second cutting edge 17 and may be smaller than the first cutting edge 15 and the second cutting edge 17. Specifically, regarding the width in the direction orthogonal to the rotation axis O when the tip cutting edge 11 is viewed from the side, the width of the third cutting edge 25 may be about ⅕ or less of the width of the first cutting edge 15 and the second cutting edge 17.

In addition, as illustrated in FIG. 2 or the like, the body 3 may further include, in addition to the tip cutting edge 11, a peripheral cutting edge 27 positioned at least at a portion of a ridge line at which the outer peripheral surface 9 and the flute 13 intersect. Specifically, the peripheral cutting edge 27 may be positioned at least at a portion of a ridge line at which the flute 13 intersects with the outer peripheral surface 9 adjacent to the flute 13 rearward in the rotating direction. For example, as in the non-limiting example illustrated in FIG. 1, the peripheral cutting edge 27a may be positioned at least at a portion of a ridge line at which the flute 13a intersects with the outer peripheral surface 9a adjacent to the flute 13a rearward in the rotating direction.

At this time, the peripheral cutting edge 27 may be connected to the tip cutting edge 11. In the case where the body 3 includes the peripheral cutting edge 27, for example, the surface accuracy of the machined hole during drilling may be improved. Further, when the workpiece is a member containing fibers such as CFRP, the fibers can be cut by the peripheral cutting edge 27, so that the surface accuracy of the machined hole may further be improved.

In particular, when the body 3 includes the peripheral cutting edge 27 and the tip cutting edge 11 further includes a fourth cutting edge 29 connected to the peripheral cutting edge 27, the workpiece can be continuously machined by the tip cutting edge 11 and the peripheral cutting edge 27. Therefore, the surface accuracy of the machined hole may further be improved.

During machining, stress may tend to concentrate between the tip cutting edge 11 and the peripheral cutting edge 27. Here, when the fourth cutting edge 29 is positioned between the second cutting edge 17 and the peripheral cutting edge 27, concentration of stress can be mitigated. Therefore, the drill 1 may have high durability. For example, the fourth cutting edge 29 may be linear or curved. In the non-limiting example illustrated in FIG. 2 or the like, the fourth cutting edge 29 may have a convex curved shape. When the fourth cutting edge 29 has a convex curved shape, the drill 1 may have higher durability.

For example, in a case where the fourth cutting edge 29 is connected to the second part 21 of the second cutting edge 17, an end portion of the tip cutting edge 11 positioned closest to the front end 3a in a region from the second part 21 to the fourth cutting edge 29 may be set as a boundary between the second part 21 and the fourth cutting edge 29.

The fourth cutting edge 29 may be smaller than the first cutting edge 15 and the second cutting edge 17. Specifically, regarding the width in the direction orthogonal to the rotation axis O when the tip cutting edge 11 is viewed from the side, the width of the fourth cutting edge 29 may be about ⅕ or less of the width of the first cutting edge 15 and the second cutting edge 17.

In a case where the first cutting edge 15 is linear when viewed from the side, a line obtained by extending the first cutting edge 15 toward the outer peripheral surface 9 may be defined as a first virtual extended line L1. At this time, the fourth cutting edge 29 may be positioned closer to the side of the rear end 3b than the first virtual extended line L1. When the fourth cutting edge 29 is positioned as described above, the thickness of the body 3 in the vicinity of the fourth cutting edge 29 may be easily ensured. Therefore, the durability of the drill 1 may further be enhanced.

Figure 3:
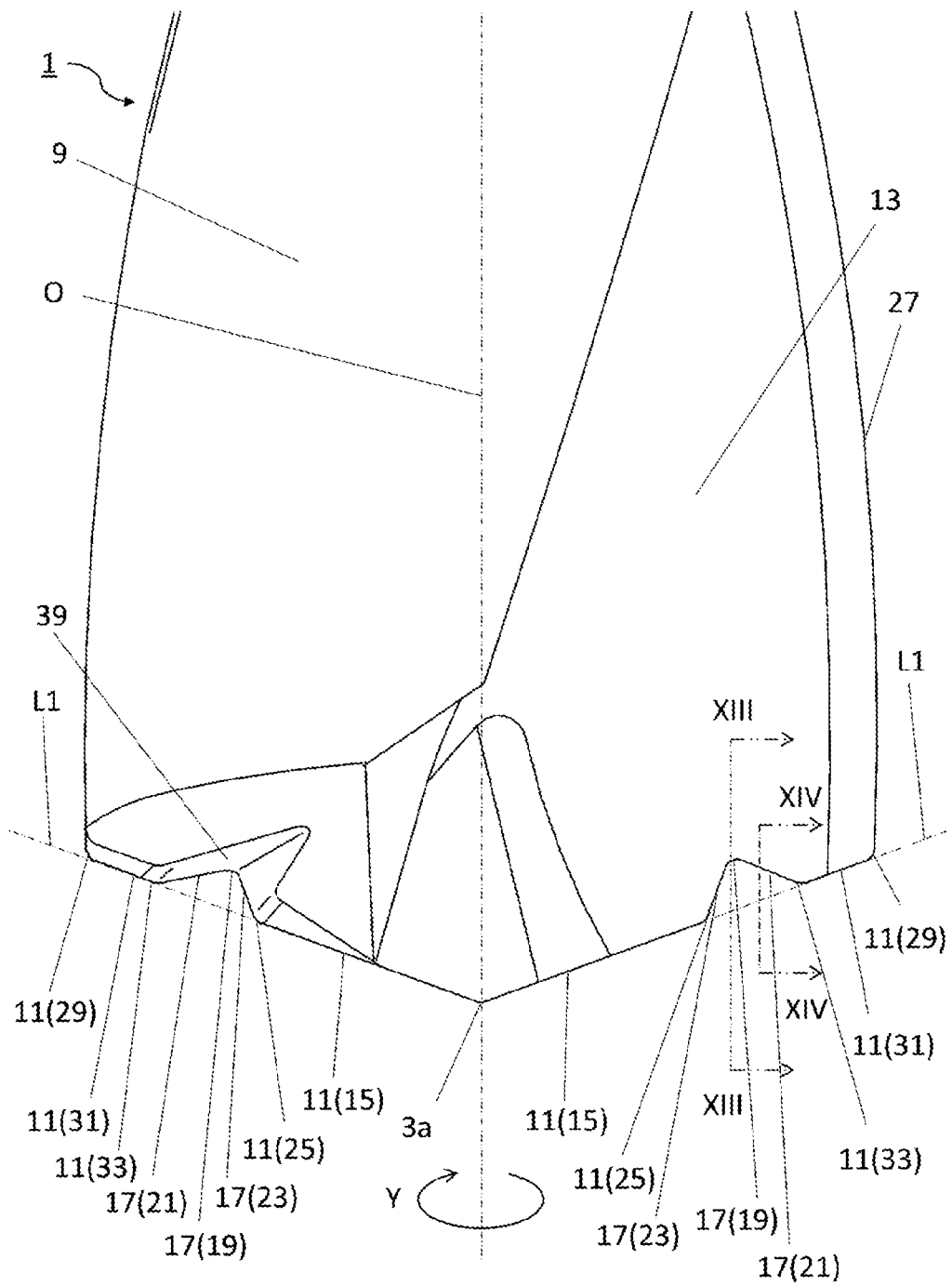
FIG. 3 is an enlarged view illustrating a drill in a non-limiting example of the present disclosure.

In addition, as illustrated in FIG. 3 or the like, the tip cutting edge 11 may include a linear fifth cutting edge 31 extending from the second part 21 toward the peripheral cutting edge 27. When the tip cutting edge 11 includes the fifth cutting edge 31, the tip cutting edge 11 may have high durability because the portion between the second cutting edge 17 and the peripheral cutting edge 27 is not easily sharpened.

In the non-limiting example illustrated in FIG. 3 or the like, the fifth cutting edge 31 may be connected to the fourth cutting edge 29. In other words, in the non-limiting example illustrated in FIG. 3 or the like, the fourth cutting edge 29 may be connected to the fifth cutting edge 31 and the peripheral cutting edge 27. In this manner, when the fourth cutting edge 29 is connected to the fifth cutting edge 31 and the peripheral cutting edge 27, the portion between the second cutting edge 17 and the peripheral cutting edge 27 may further be less likely to be sharpened. Therefore, the tip cutting edge 11 may have even higher durability.

In a case where the fourth cutting edge 29 has a convex curved shape and is smoothly connected to the fifth cutting edge 31, a portion where the tip cutting edge 11 changes from a linear shape to a convex curved shape in a region from the fifth cutting edge 31 to the fourth cutting edge 29 may be set as a boundary between the fifth cutting edge 31 and the fourth cutting edge 29.

In addition, for example, when the fifth cutting edge 31 is connected to the second part 21 of the second cutting edge 17, in a region from the second part 21 to the fifth cutting edge 31 of the tip cutting edge 11, an end portion positioned closest to the side of the front end 3a may be set as a boundary between the second part 21 and the fifth cutting edge 31.

Figure 4:
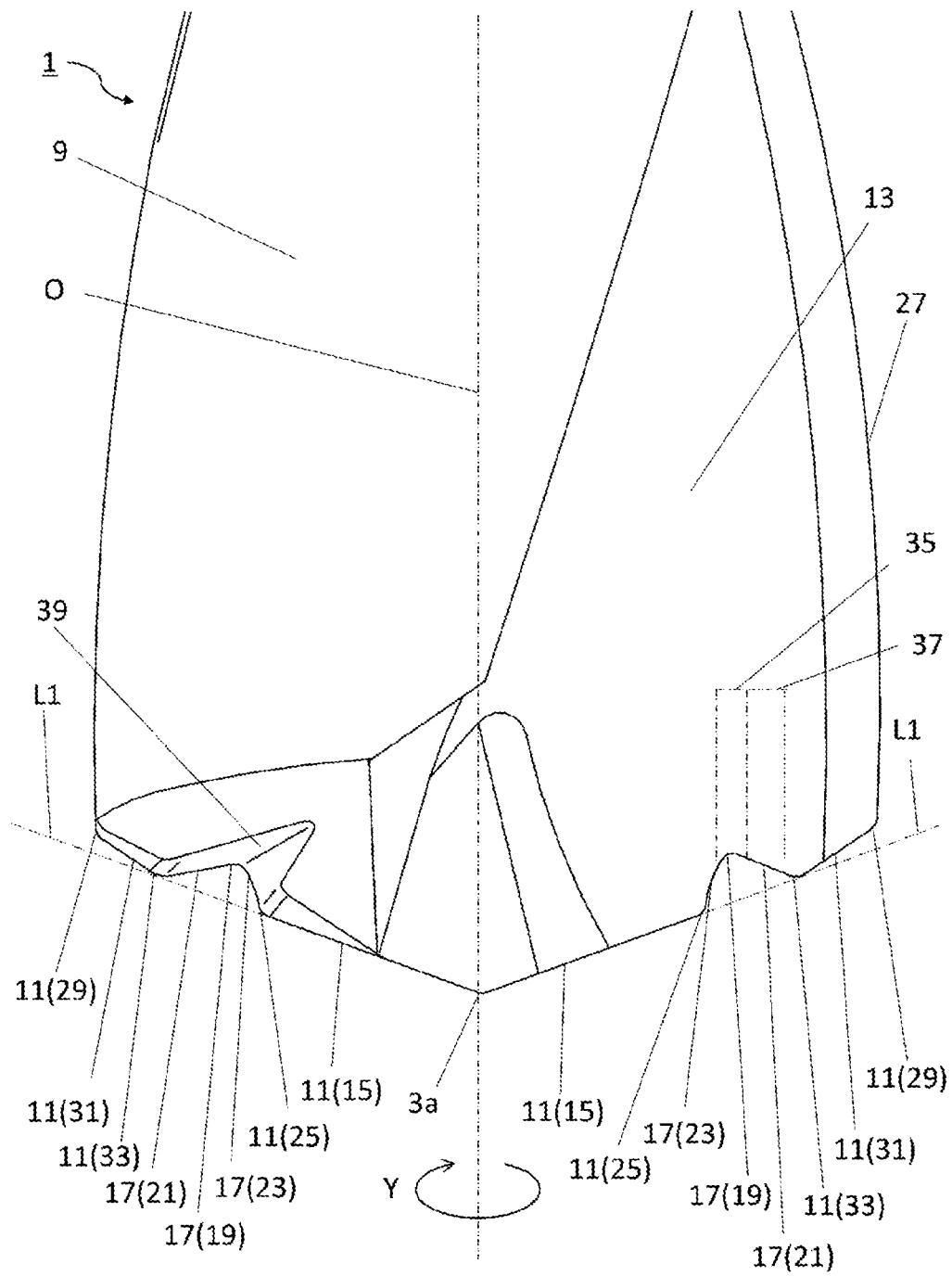
FIG. 4 is an enlarged view illustrating a drill of a non-limiting example of the present disclosure.
Figure 5:
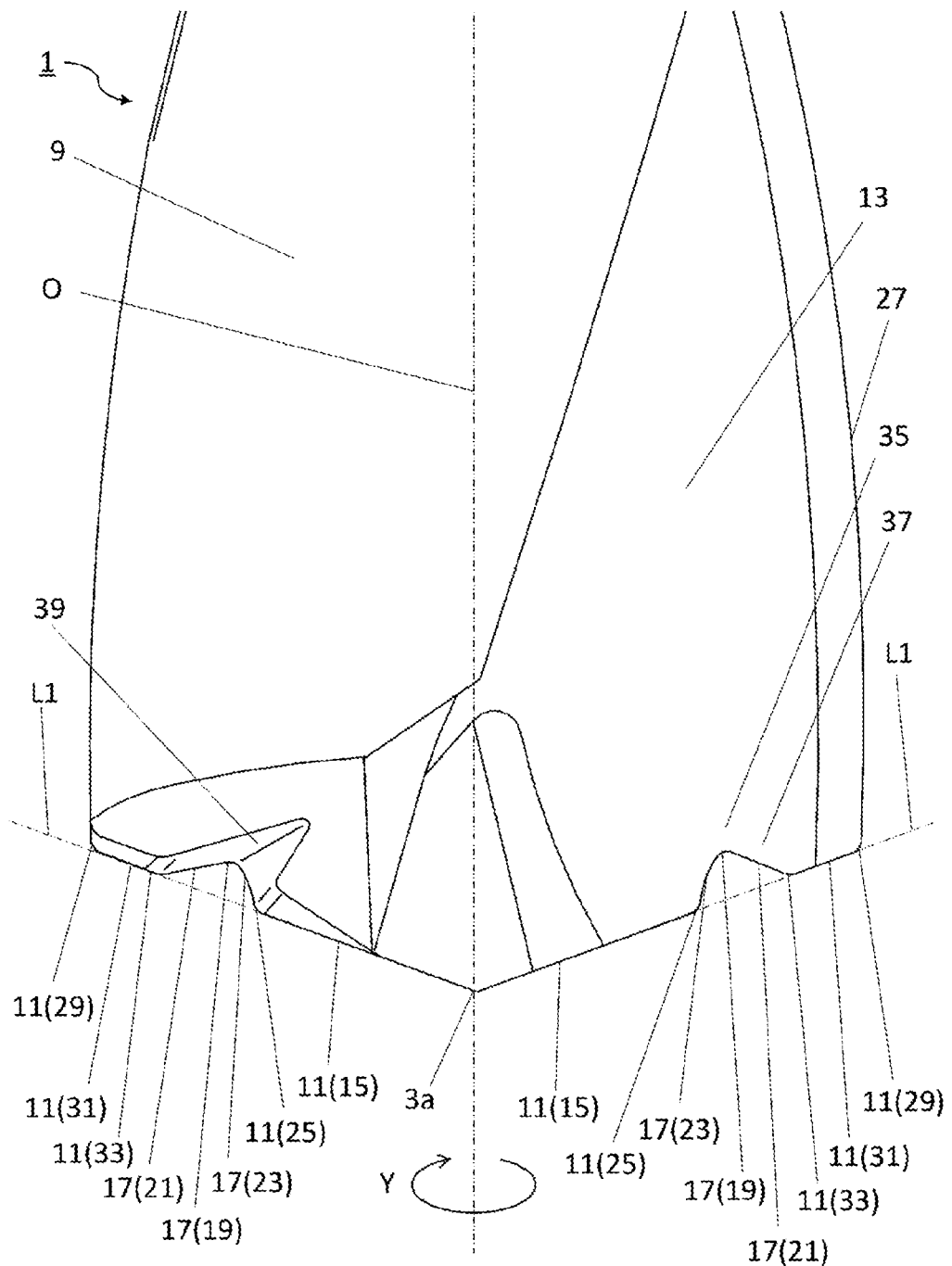
FIG. 5 is an enlarged view illustrating a drill of a non-limiting example of the present disclosure.

When viewed from the side, the fifth cutting edge 31 may be parallel to the first virtual extended line L1 as illustrated in FIG. 3, for example, or may be inclined with respect to the first virtual extended line L1 as illustrated in FIG. 4, for example.

When viewed from the side as in the non-limiting example illustrated in FIG. 3, in a case where the fifth cutting edge 31 is parallel to the first virtual extended line L1, the variation between the direction of the machining load applied to the first cutting edge 15 and the direction of the machining load applied to the fifth cutting edge 31 may be small. Therefore, distortion may be less likely to occur in the drill 1, and the durability of the drill 1 may be high.

In addition, when viewed from the side as in the non-limiting example illustrated in FIG. 4, when the fifth cutting edge 31 is inclined with respect to the first virtual extended line L1, a part of the machining load applied to the first cutting edge 15 and a part of the machining load applied to the fifth cutting edge 31 may be canceled. Therefore, chatter vibration of the drill 1 may be suppressed.

Here, the fifth cutting edge 31 may be inclined such that the inclination angle of the fifth cutting edge 31 with respect to the rotation axis O is larger than the inclination angle of the first virtual extended line L1 with respect to the rotation axis O, as in a case where an end portion of the fifth cutting edge 31 on the side of the outer peripheral surface 9 is positioned closer to the side of the front end 3a than the first virtual extended line L1. In this case, the radial load may be reduced. Therefore, the diameter reduction phenomenon of the machined hole can be suppressed.

When viewed from the side as in the non-limiting example illustrated in FIG. 4, the fifth cutting edge 31 may be inclined such that the inclination angle of the fifth cutting edge 31 with respect to the rotation axis O is smaller than the inclination angle of the first virtual extended line L1 with respect to the rotation axis O.

In this case, the angle formed between the fifth cutting edge 31 and the peripheral cutting edge 27 when the fifth cutting edge 31 is viewed from the side can be increased. Therefore, chipping may be less likely to occur between the fifth cutting edge 31 and the peripheral cutting edge 27. In addition, for example, when CFRP is processed, the carbon fibers contained in the CFRP may be easily cut by the fifth cutting edge 31, and thus delamination may be less likely to occur in the CFRP.

In addition, as illustrated in FIG. 3 or the like, the tip cutting edge 11 may include a sixth cutting edge 33 connected to the second part 21 and the fifth cutting edge 31. During machining, stress may be likely to concentrate between the second part 21 and the fifth cutting edge 31. However, when the tip cutting edge 11 includes the sixth cutting edge 33 positioned between the second part 21 and the fifth cutting edge 31, stress concentration can be mitigated.

For example, the sixth cutting edge 33 may have a linear configuration inclined with respect to the second part 21 and the fifth cutting edge 31 when viewed from the side or may have a curved configuration. In the non-limiting example illustrated in FIG. 3 or the like, the sixth cutting edge 33 may have a convex curved shape. Additionally, It may mean that the sixth cutting edge 33 is convex from the side of the rear end 3b toward the side of the front end 3a.

For example, when the sixth cutting edge 33 has a convex curved shape and each of the second part 21 and the fifth cutting edge 31 has a linear shape, a portion where the tip cutting edge 11 changes from a linear shape to a convex curved shape in a region from the second part 21 to the fifth cutting edge 31 may be set as a boundary between the second part 21 and the sixth cutting edge 33. In addition, a portion where the tip cutting edge 11 changes from a convex curved shape to a linear shape in a region from the second part 21 to the fifth cutting edge 31 may be set as a boundary between the sixth cutting edge 33 and the fifth cutting edge 31.

The sixth cutting edge 33 may be smaller than the first cutting edge 15 and the second cutting edge 17. Specifically, regarding the width in the direction orthogonal to the rotation axis O when the tip cutting edge 11 is viewed from the side, the width of the sixth cutting edge 33 may be about ⅕ or less of the width of the first cutting edge 15 and the second cutting edge 17.

Figure 7:
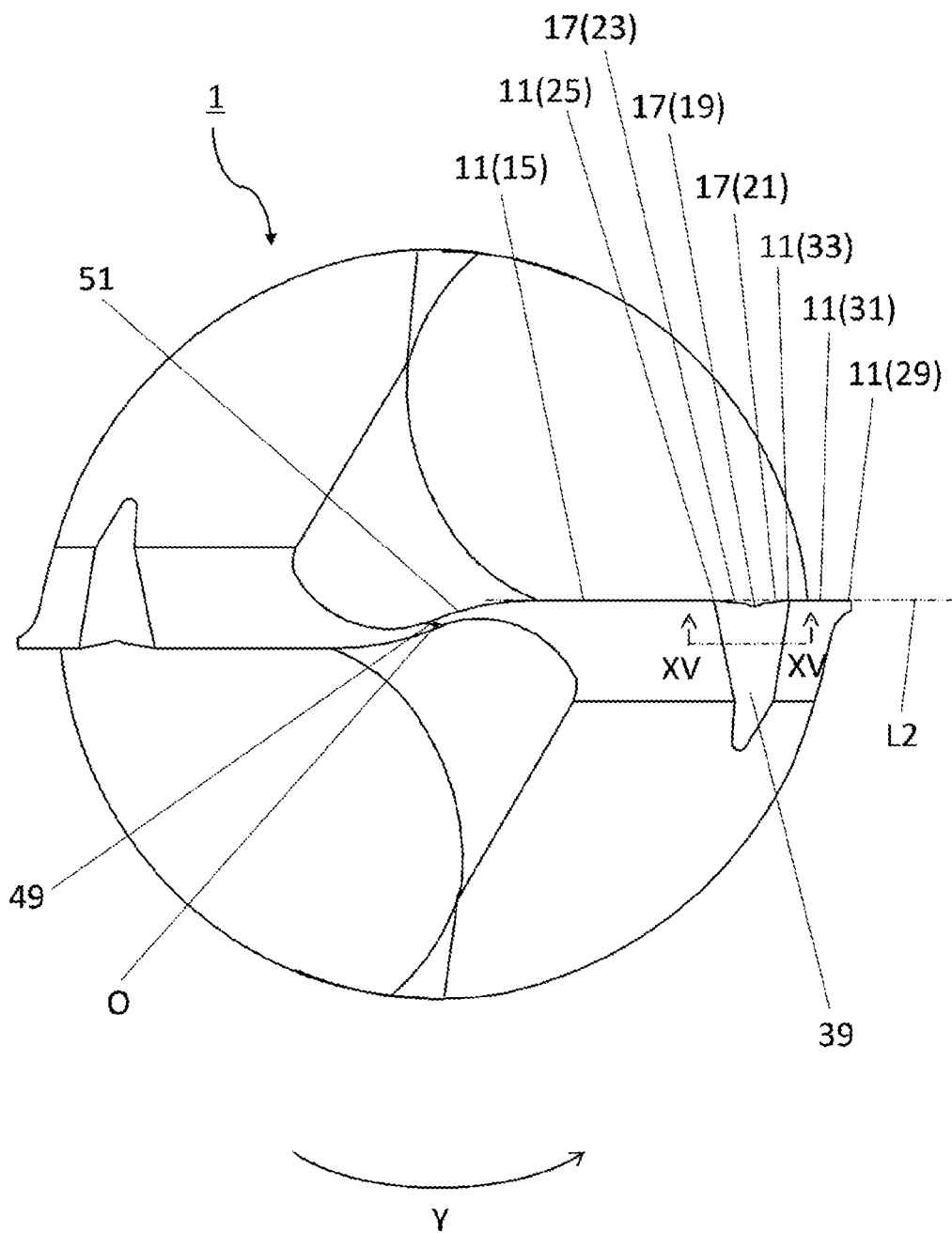
FIG. 7 is a front view of the drill illustrated in FIG. 1 as viewed from a direction B1.

When viewed toward the front end 3a in a front view as in the non-limiting example illustrated in FIG. 7, the tip cutting edge 11 may further include a chisel edge 49 including the rotation axis O and a thinning edge 51 extending from the chisel edge 49 toward the outer peripheral surface 9 of the body 3. When viewed toward the front end 3a as in the non-limiting example illustrated in FIG. 7, that is, in a front view, the thinning edge 51 may be positioned closer to the side of the rotation axis O than the first cutting edge 15. In the following description, a simple "front view" may mean a case where the body 3 is viewed toward the front end 3a.

In the present disclosure, the chisel edge 49 may mean a region, in the tip cutting edge 11, that includes the rotation axis O and has a negative rake angle. Further, the thinning edge 51 may mean a region, in the tip cutting edge 11, that is continuous with a thinning surface formed by cutting a portion of the flute 13.

Further, as illustrated in FIG. 7 or the like, the first cutting edge 15 may be linear in a front view of the body 3. At this time, a line obtained by extending the linear first cutting edge 15 toward the outer peripheral surface 9 may be defined as a second virtual extended line L2. As illustrated in FIG. 7, the fifth cutting edge 31 may be positioned on the second virtual extended line L2, and as illustrated in FIGS. 8 and 9, the fifth cutting edge 31 may not be positioned on the second virtual extended line L2.

As in the non-limiting example illustrated in FIG. 7, when the fifth cutting edge 31 is positioned on the second virtual extended line L2 in the front view of the body 3, the behavior of the drill 1 during machining may be likely to be stable. Therefore, the drill 1 in the case where the fifth cutting edge 31 is positioned on the second virtual extended line L2 can provide high hole quality.

Figure 8:
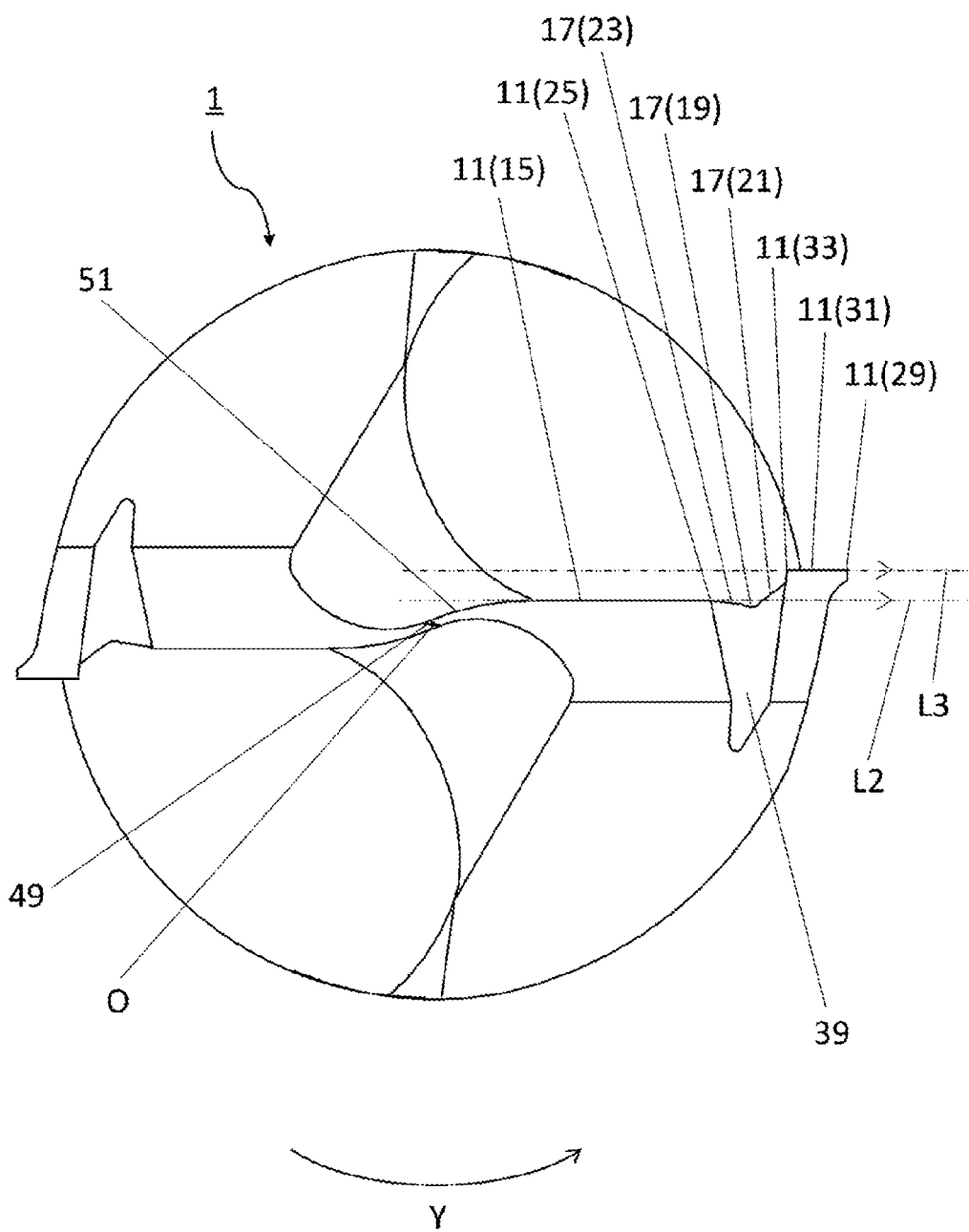
FIG. 8 is a front view illustrating a drill of a non-limiting example of the present disclosure.
Figure 9:
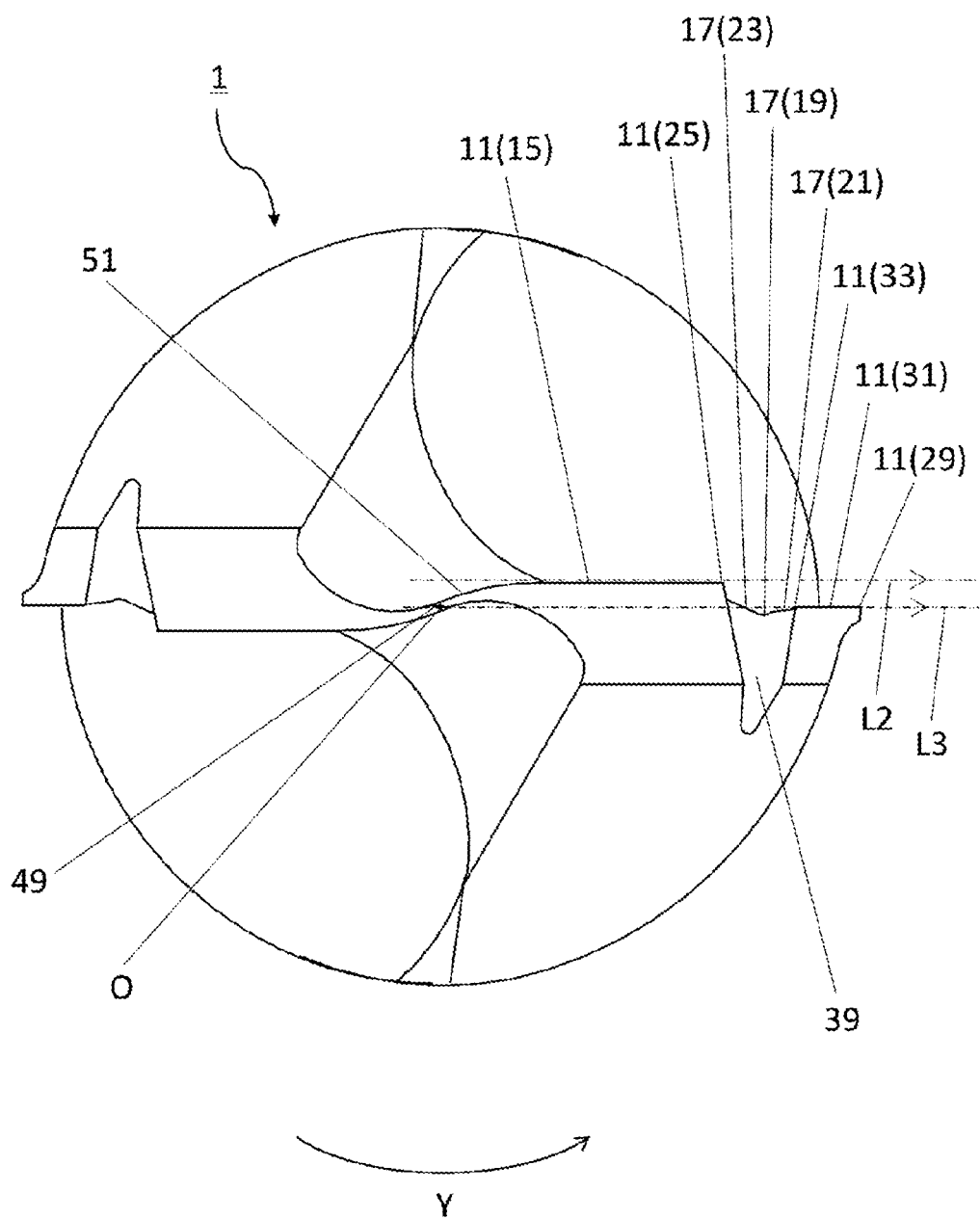
FIG. 9 is a front view illustrating a drill of a non-limiting example of the present disclosure.
Figure 10:
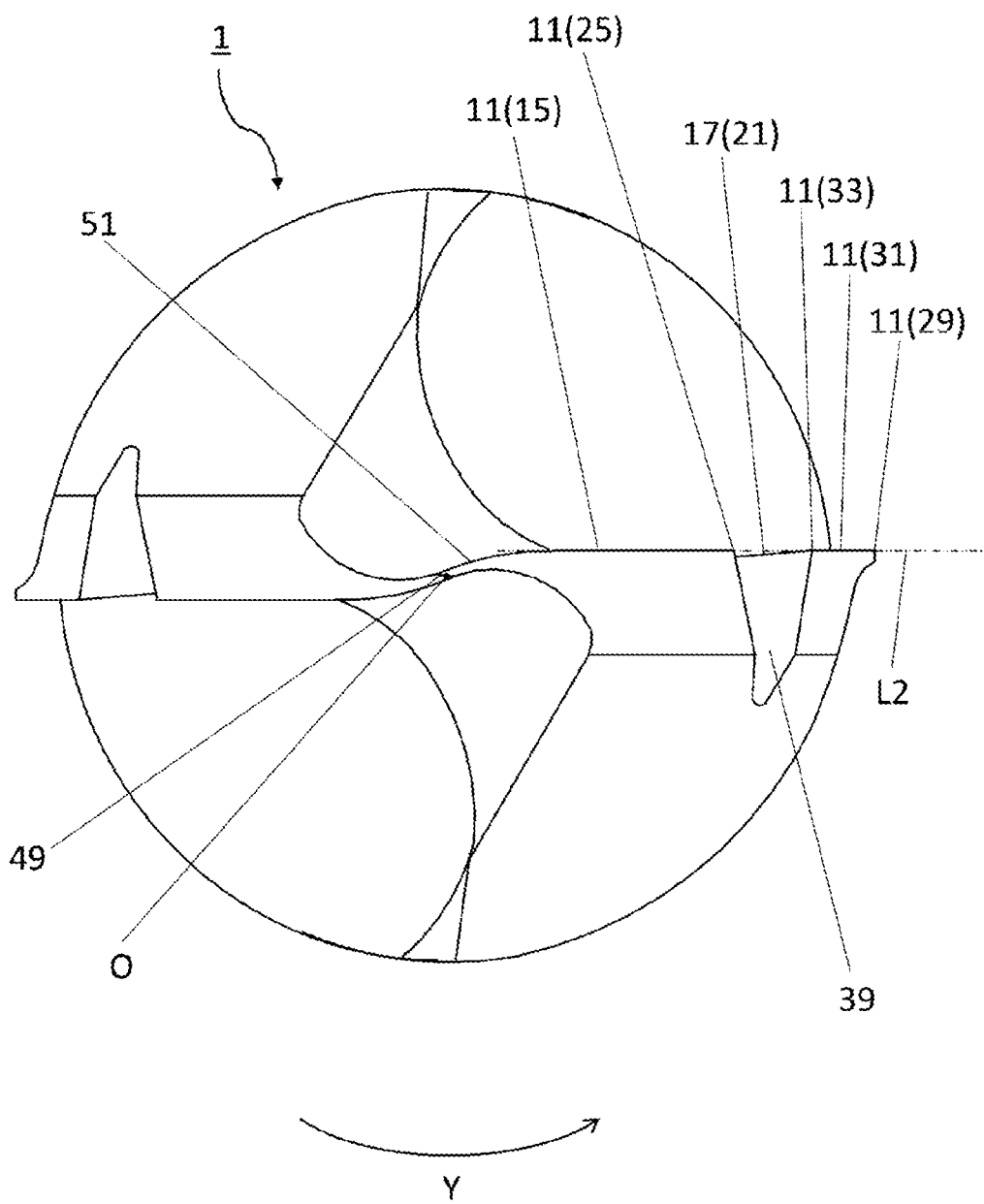
FIG. 10 is a front view illustrating a drill of a non-limiting example of the present disclosure.

Further, as illustrated in FIGS. 8 and 9, when the fifth cutting edge 31 is not positioned on the second virtual extended line L2 in the front view of the body 3, the timing of contact with the workpiece may differ between the first cutting edge 15 and the fifth cutting edge 31. Therefore, the vibration mode may be different between the first cutting edge 15 and the fifth cutting edge 31, and chatter vibration may be easily canceled between the first cutting edge 15 and the fifth cutting edge 31. Therefore, chatter vibration may be less likely to occur in the drill 1 where the fifth cutting edge 31 is not positioned on the second virtual extended line L2.

As in the non-limiting example illustrated in FIG. 8, in the front view of the body 3, the fifth cutting edge 31 may be positioned forward of the second virtual extended line L2 in a rotating direction Y. In this case, an end portion of the fifth cutting edge 31 on the side of the rotation axis O may be likely to come into contact with the workpiece before the first cutting edge 15. Therefore, the drill 1 in the non-limiting example illustrated in FIG. 8 may have good biting properties and high straight running performance.

As in the non-limiting example illustrated in FIG. 9, in the front view of the body 3, the fifth cutting edge 31 may be positioned rearward of the second virtual extended line L2 in the rotating direction Y. In this case, the first cutting edge 15 may be likely to come into contact with the workpiece before the fifth cutting edge 31. Therefore, a small-diameter hole may be formed by the first cutting edge 15, and then the diameter of the machined hole may be expanded by the fifth cutting edge 31.

As a result, the drilling posture of the drill 1 may be easily stabilized before the fifth cutting edge 31 comes into contact with the workpiece. Therefore, since the fifth cutting edge 31 comes into contact with the workpiece in a state where the drilling posture is stable, the machining resistance to the fifth cutting edge 31 may be suppressed. Therefore, the drill 1 in the non-limiting example illustrated in FIG. 9 may have high machinability.

Figure 11:
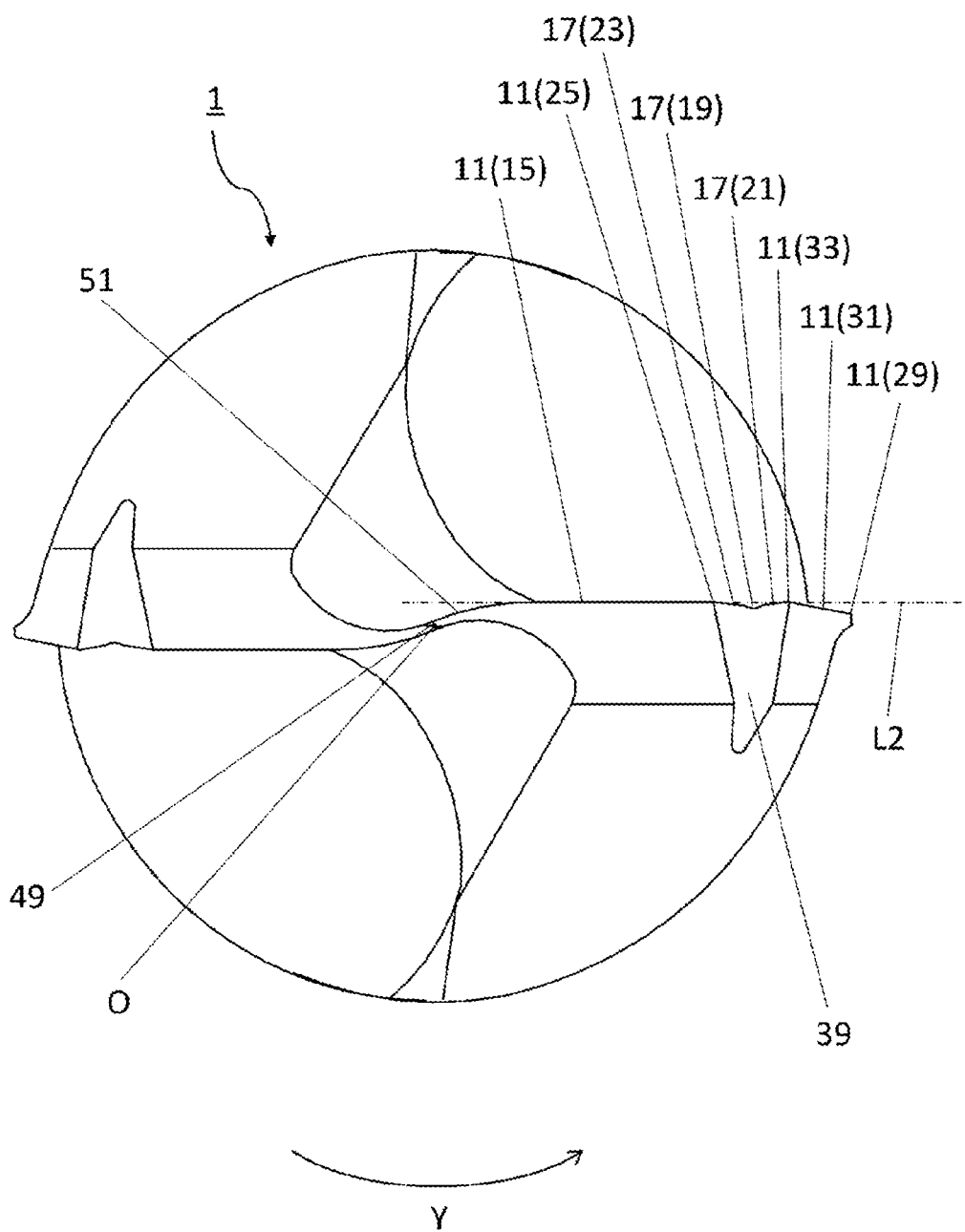
FIG. 11 is a front view illustrating a drill of a non-limiting example of the present disclosure.
Figure 12:
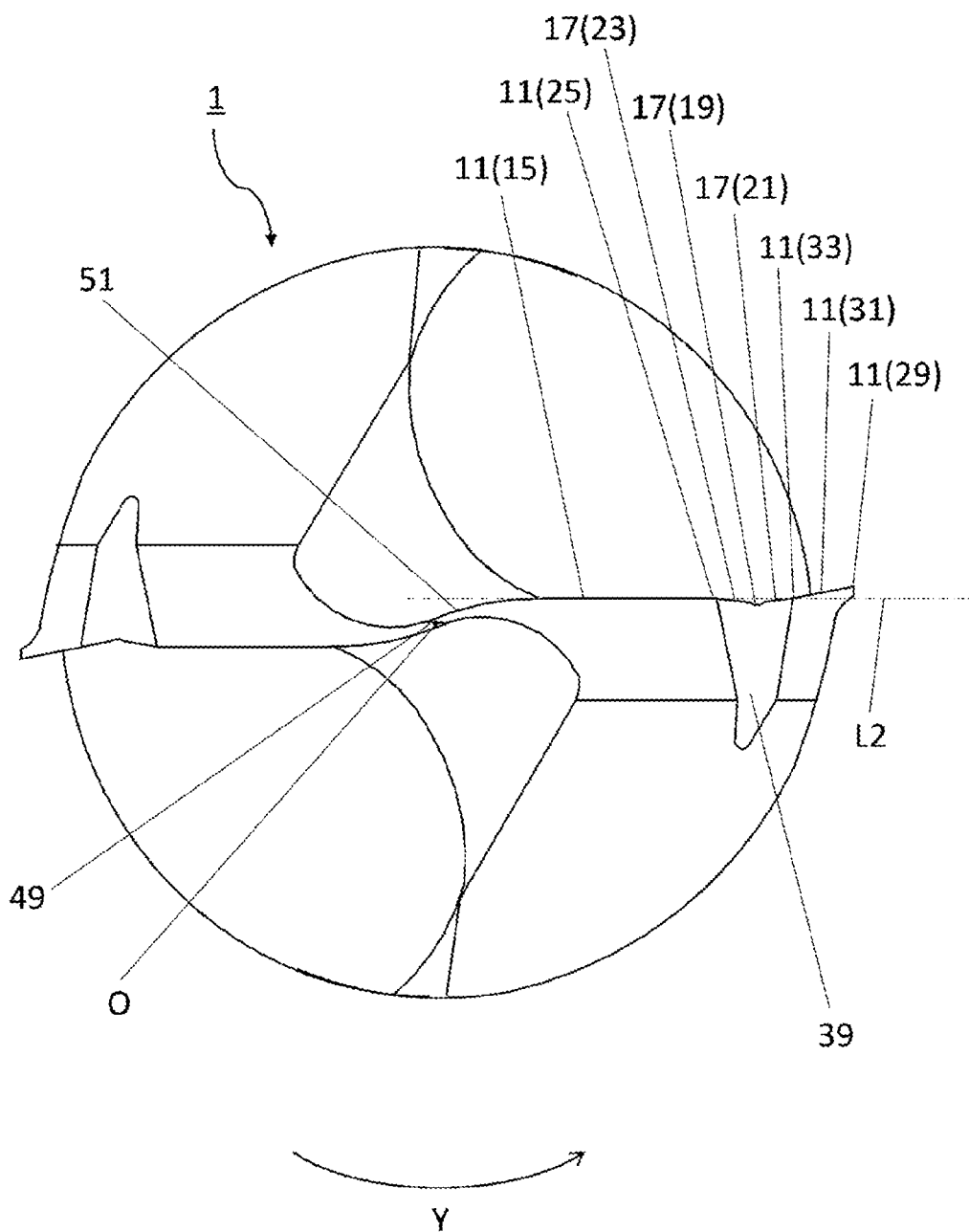
FIG. 12 is a front view illustrating a drill of a non-limiting example of the present disclosure.

In addition, as illustrated in FIGS. 7 to 10, in the front view of the body 3, the fifth cutting edge 31 may be positioned parallel to the second virtual extended line L2, and as illustrated in FIGS. 11 and 12, in the front view of the body 3, the fifth cutting edge 31 may be inclined with respect to the second virtual extended line L2.

As illustrated in FIGS. 7 to 10, in the front view of the body 3, when the fifth cutting edge 31 is positioned parallel to the second virtual extended line L2, the behavior of the drill 1 during machining may be likely to be stable. Therefore, the drill 1 in the case where the fifth cutting edge 31 is positioned parallel to the second virtual extended line L2 can provide high hole quality.

In FIGS. 8 and 9, the fifth cutting edge 31 may be positioned on a virtual straight line L3 parallel to the second virtual extended line L2.

In addition, as in the non-limiting example illustrated in FIG. 11, in the front view of the body 3, the end portion of the fifth cutting edge 31 on the side of the outer peripheral surface 9 may be positioned to be inclined rearward in the rotating direction Y with respect to the end portion of the fifth cutting edge 31 on the side of the rotation axis O. When the fifth cutting edge 31 has the above-described configuration, the fifth cutting edge 31 may have high cutting edge strength. Therefore, the drill 1 in the non-limiting example illustrated in FIG. 11 may have high durability.

In addition, as in the non-limiting example illustrated in FIG. 12, in the front view of the body 3, the end portion of the fifth cutting edge 31 on the side of the outer peripheral surface 9 may be positioned to be inclined forward in the rotating direction Y with respect to the end portion of the fifth cutting edge 31 on the side of the rotation axis O. When the fifth cutting edge 31 has the above-described configuration, the fifth cutting edge 31 may have good sharpness. Therefore, the drill 1 in the non-limiting example illustrated in FIG. 12 may have high machinability.

Further, as illustrated in FIG. 4, the flute 13 may have a first surface 35 positioned along the first part 19 and a second surface 37 positioned along the second part 21. In other words, the first surface 35 may extend from the first part 19 toward the rear end 3b. In other words, the second surface 37 may extend from the second part 21 toward the rear end 3b. At this time, as illustrated in FIGS. 13 and 14, which are cross-sectional views of the flute 13 illustrated in FIG. 3, an axial rake angle θ2 on the second surface 37 may be smaller than an axial rake angle θ1 on the first surface 35.

Figure 13:
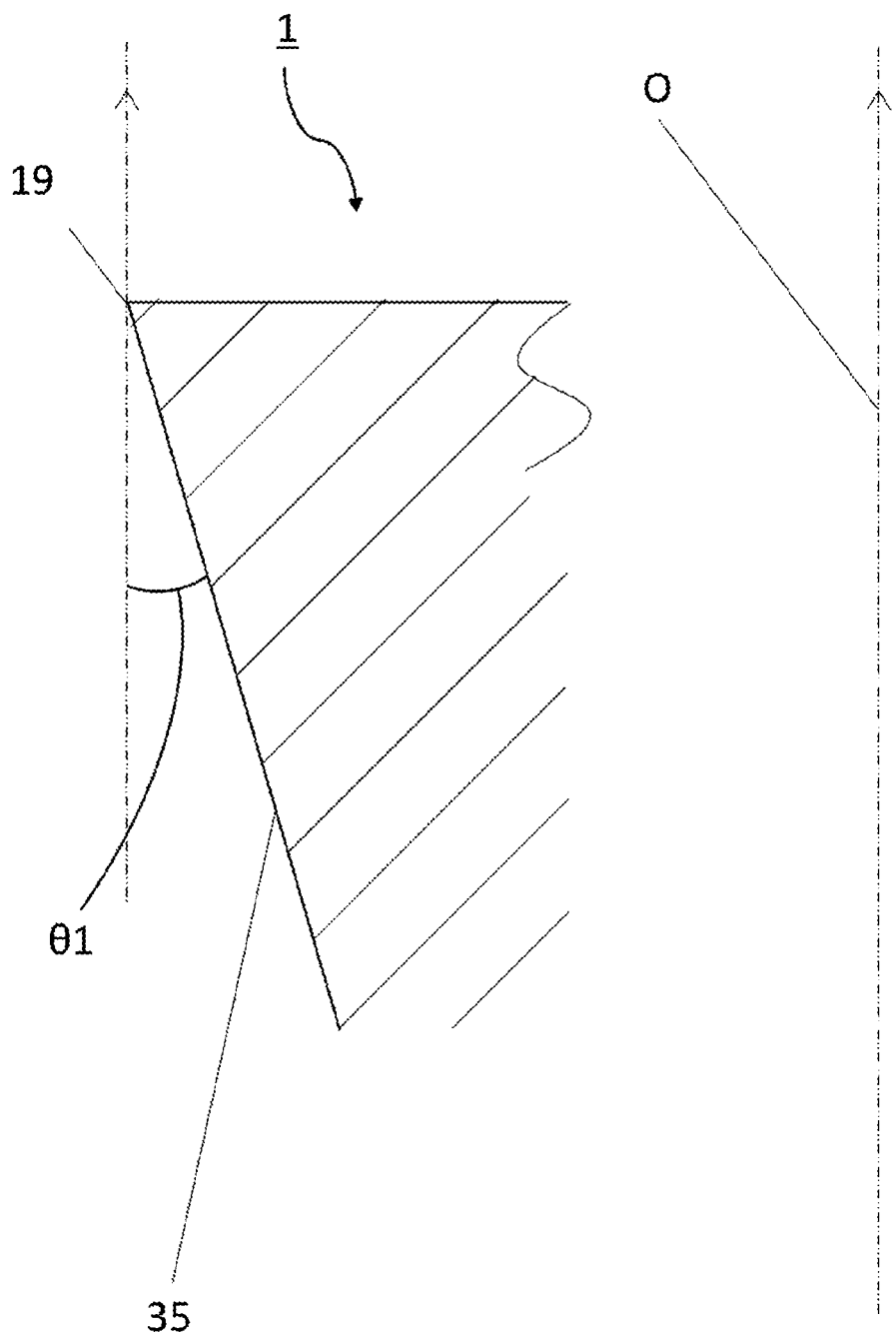
FIG. 13 is a cross-sectional view illustrating an XIII-XIII cross-section in FIG. 3.
Figure 14:
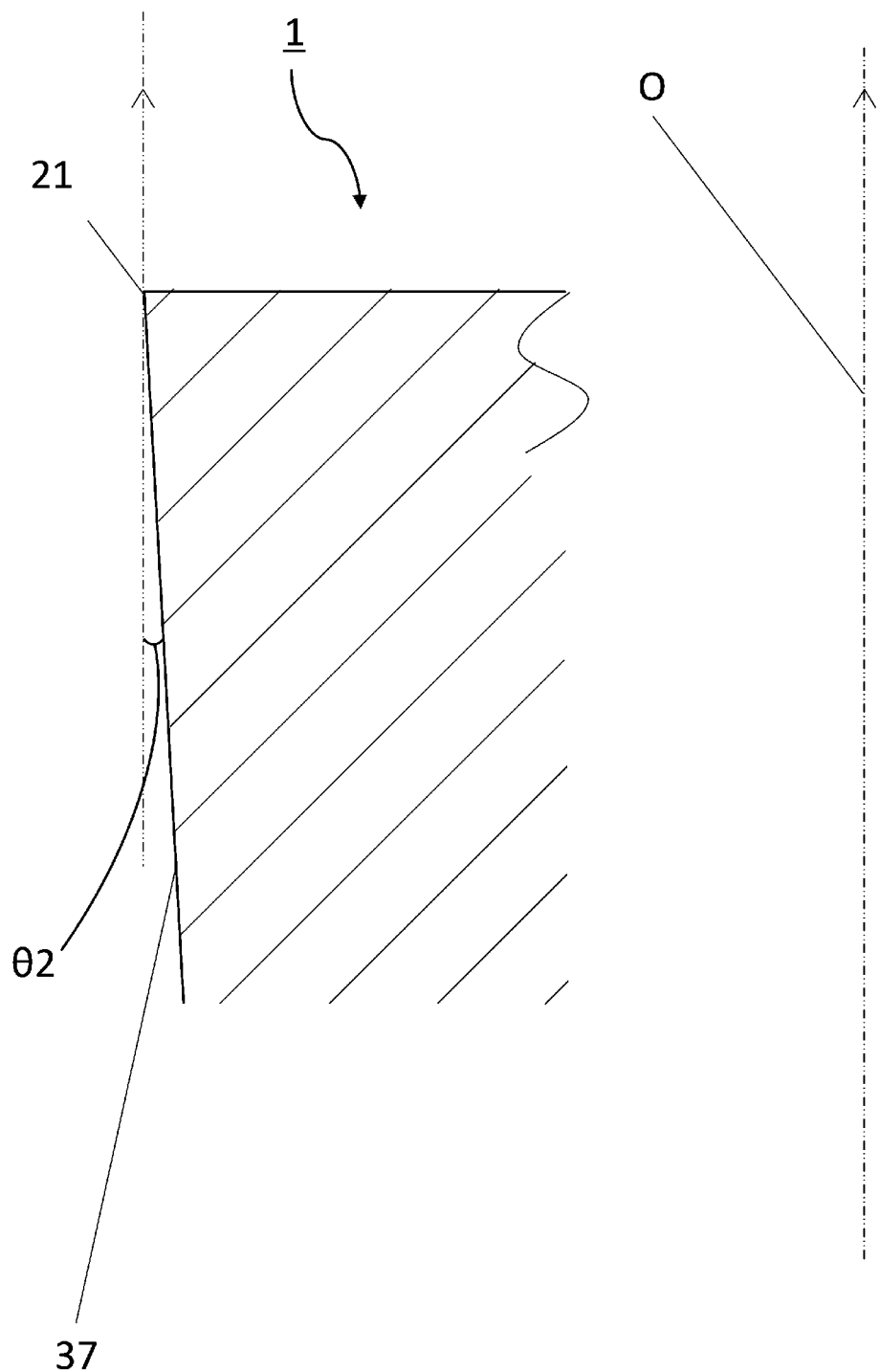
FIG. 14 is a cross-sectional view illustrating an XIV-XIV cross-section in FIG. 3.

Note that FIG. 13 may be a cross-section that includes an end portion of the first part 19 positioned closest to the side of the second end 3b, that is parallel to the rotation axis O, and that is along the rotating direction Y. Further, FIG. 14 may be a cross-section that includes the center of the second part 21, that is parallel to the rotation axis O, and that is along the rotating direction Y. The axial rake angle θ1 may mean an angle formed by a portion of the first surface 35 along the first part 19 and the rotation axis O in the cross-section illustrated in FIG. 13. The axial rake angle θ2 may mean an angle formed by a portion of the second surface 37 along the second part 21 and the rotation axis O in the cross-section illustrated in FIG. 14.

When the flute 13 includes the first surface 35 and the second surface 37, the drill 1 may have high durability. Since the second part 21 is positioned closer to the side of the outer peripheral surface 9 than the first part 19 during machining, the rotation speed may be high and the impact received from the workpiece may be likely to be large. In the non-limiting example illustrated in FIGS. 13 and 14, the axial rake angle θ2 on the second surface 37 may be smaller than the axial rake angle θ1 on the first surface 35. Since the durability of the second part 21 that is more likely to receive a large impact is improved, the drill 1 may have high durability.

Figure 15:
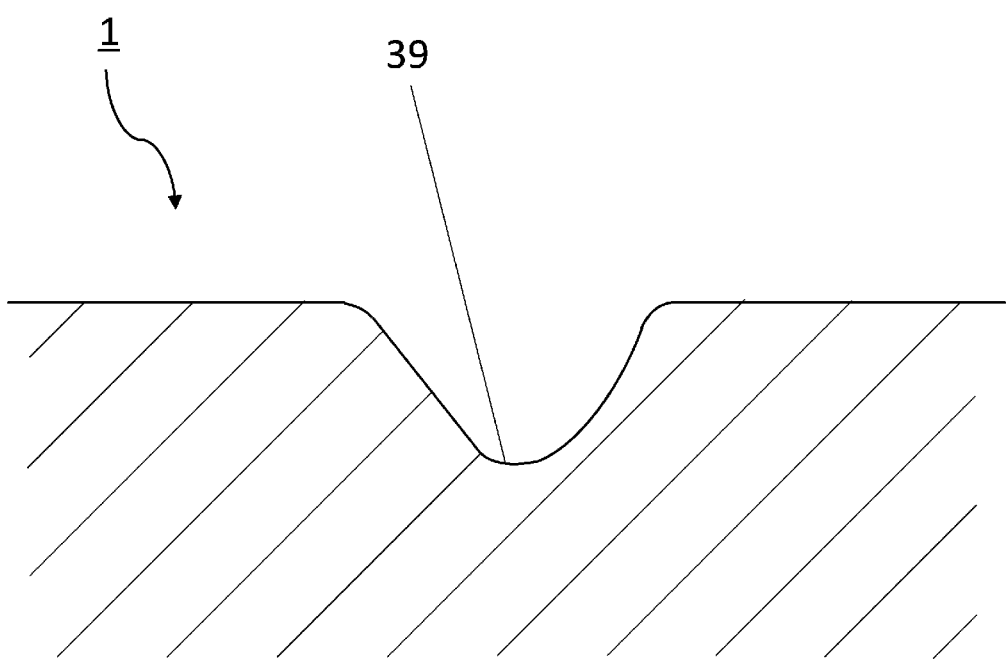
FIG. 15 is a cross-sectional view illustrating an XV-XV cross-section in FIG. 7.

In addition, as in the non-limiting example illustrated in FIG. 7, in a front view, the body 3 may include a concave groove portion 39 extending rearward in the rotating direction Y from the second cutting edge 17. At this time, as in the non-limiting example illustrated in FIG. 15, the groove bottom of the concave groove portion 39 may be a concave curved surface. When the groove bottom of the concave groove portion 39 is a concave curved surface, stress may be less likely to concentrate on the groove bottom of the concave groove portion 39. Therefore, the drill 1 in the case where the groove bottom of the concave groove portion 39 is a concave curved surface may have high durability.

Figure 16:
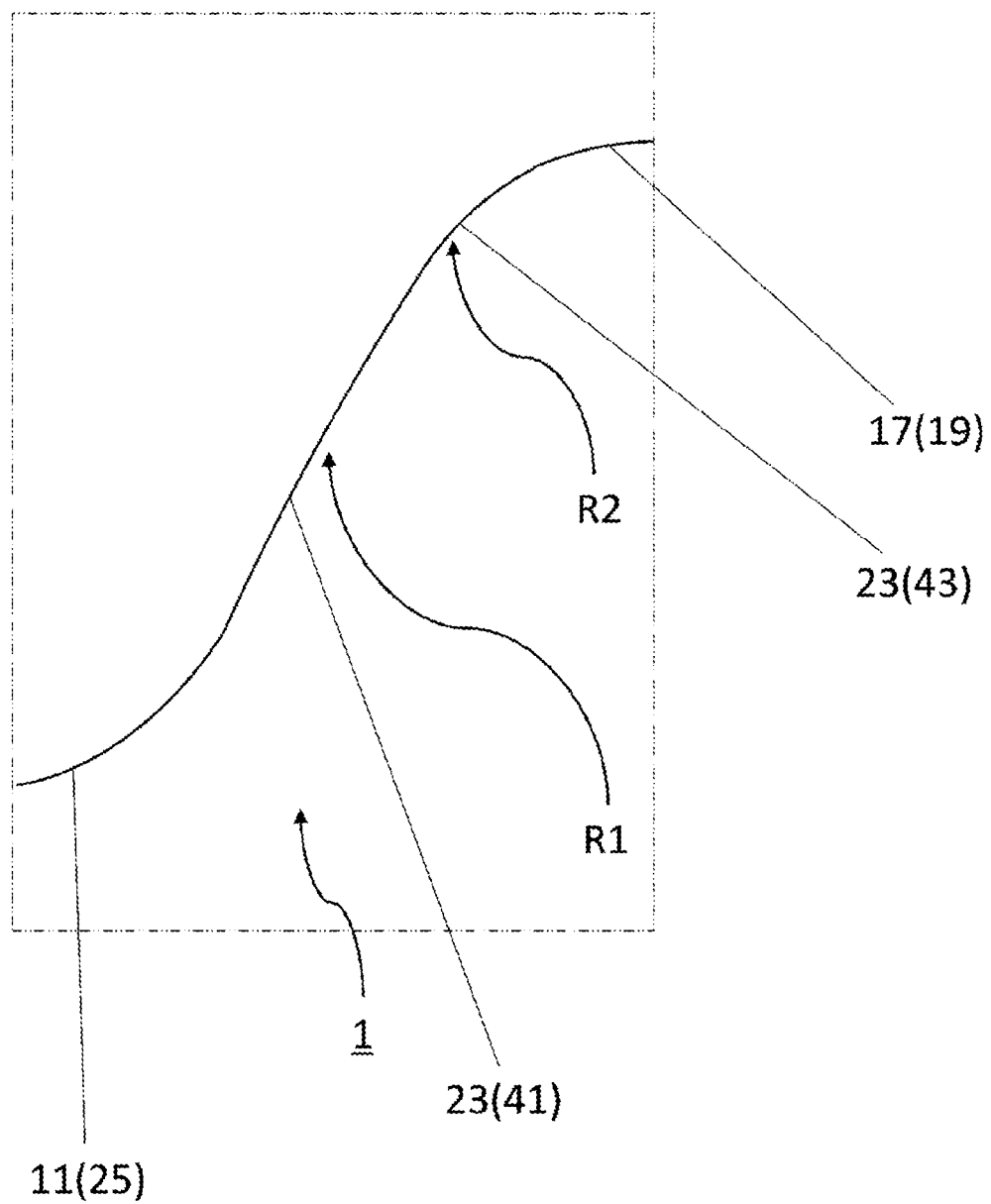
FIG. 16 is an enlarged view of a region A2 illustrated in FIG. 2.

In addition, as in the non-limiting example illustrated in FIG. 16, in a case where the third part 23 has a gently concave curved shape, the third part 23 may include a first portion 41 and a second portion 43 positioned closer to the side of the outer peripheral surface 9 than the first portion 41. A radius of curvature R1 of the first portion 41 may be larger than a radius of curvature R2 of the second portion 43.

As in the non-limiting example illustrated in FIG. 16, when the radius of curvature R1 of the first portion 41 is larger than the radius of curvature R2 of the second portion 43, the drill 1 may have good sharpness even in machining with a large feed rate. When the radius of curvature R1 of the first portion 41 is smaller than the radius of curvature R2 of the second portion 43, the drill 1 may have good sharpness even in machining with a small feed rate.

Figure 17:
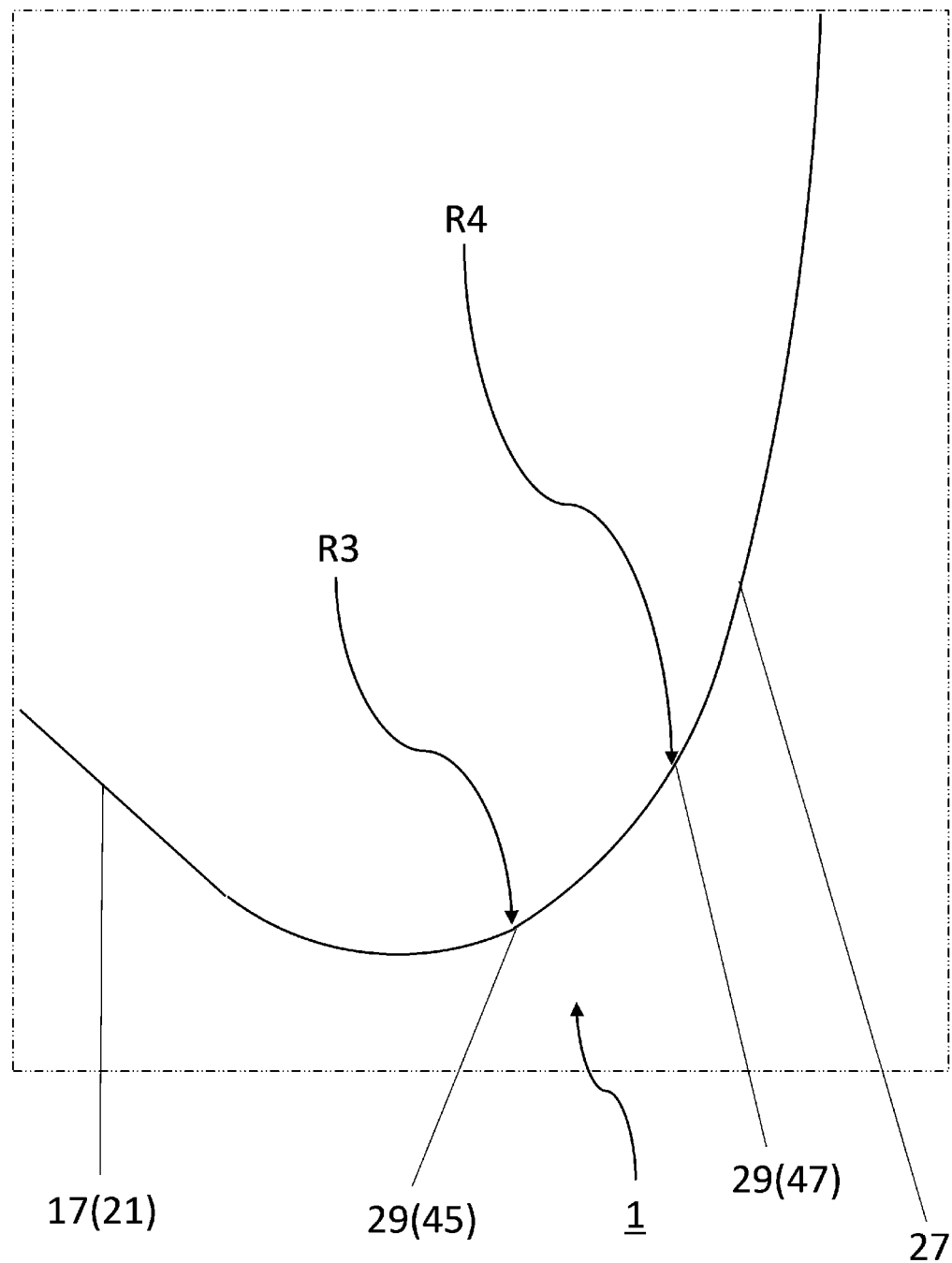
FIG. 17 is an enlarged view of a region A3 illustrated in FIG. 2.

In addition, as in the non-limiting example illustrated in FIG. 17, in a case where the fourth cutting edge 29 has a convex curved shape, the fourth cutting edge 29 may include a third portion 45 and a fourth portion 47 positioned closer to the side of the outer peripheral surface 9 than the third portion 45. Moreover, a radius of curvature R3 of the third portion 45 may be smaller than a radius of curvature R4 of the fourth portion 47.

As in the non-limiting example illustrated in FIG. 17, when the radius of curvature R3 of the third portion 45 is smaller than the radius of curvature R4 of the fourth portion 47, the workpiece can be cut with low machining resistance during machining. Therefore, the drill 1 in the non-limiting example illustrated in FIG. 17 can provide high hole quality. When the radius of curvature R3 of the third portion 45 is larger than the radius of curvature R4 of the fourth portion 47, the fourth cutting edge 29 may have high cutting edge strength. Therefore, the drill 1 in the non-limiting example illustrated in FIG. 17 may have high durability.

The material of the body 3 may include cemented carbide alloy and cermet or the like, for example. The composition of the cemented carbide alloy may include WC-Co, WC-TiC-Co, and WC-TiC-TaC-Co, for example. Here, WC, TiC, and TaC may be hard particles, and Co may be a binder phase. Cermet may be a sintered composite material in which a metal is combined with a ceramic component. Specifically, examples of the cermet may include a titanium compound containing titanium carbide (TiC) or titanium nitride (TiN) as a main component.

The surface of the body 3 may be coated with a coating using a chemical vapor deposition (CVD) method or a physical vapor deposition (PVD) method. Non-limiting examples of the composition of the coating film may include titanium carbide (TiC), titanium nitride (TiN), titanium carbonitride (TiCN), and alumina ($Al_2O_3$), or the like.

Method of Manufacturing Machined Product

Next, a method of manufacturing a machined product according to a non-limiting embodiment of the present disclosure will be described in detail with reference to an non-limiting example in which the drill 1 according to the above-described embodiment is used. Hereinafter, description will be given with reference to FIGS. 18 to 20.

A method of manufacturing a machined product according to an non-limiting embodiment of the present disclosure may include the steps of: (1) rotating the drill 1 around the rotation axis O; (2) bringing a cutting edge of the rotating drill 1 into contact with a workpiece 100; (3) separating the drill 1 from the workpiece 100.

Figure 18:
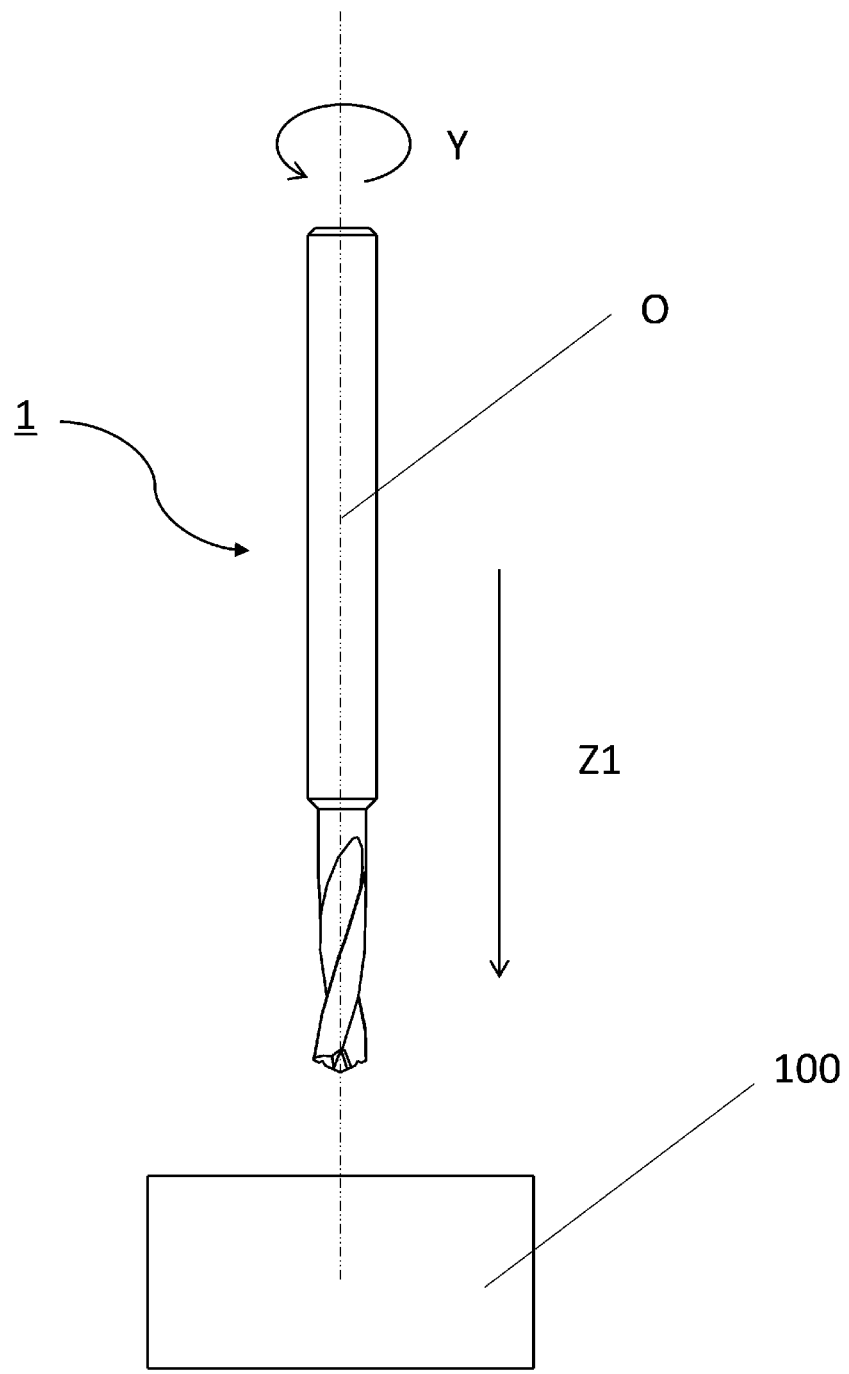
FIG. 18 is a view of a step in a method of manufacturing a machined product of a non-limiting example of the present disclosure.

More specifically, first, as illustrated in FIG. 18, the drill 1 may be rotated around the rotation axis O and moved in a direction Z1 along the rotation axis O, thereby bringing the drill 1 relatively close to the workpiece 100.

Figure 19:
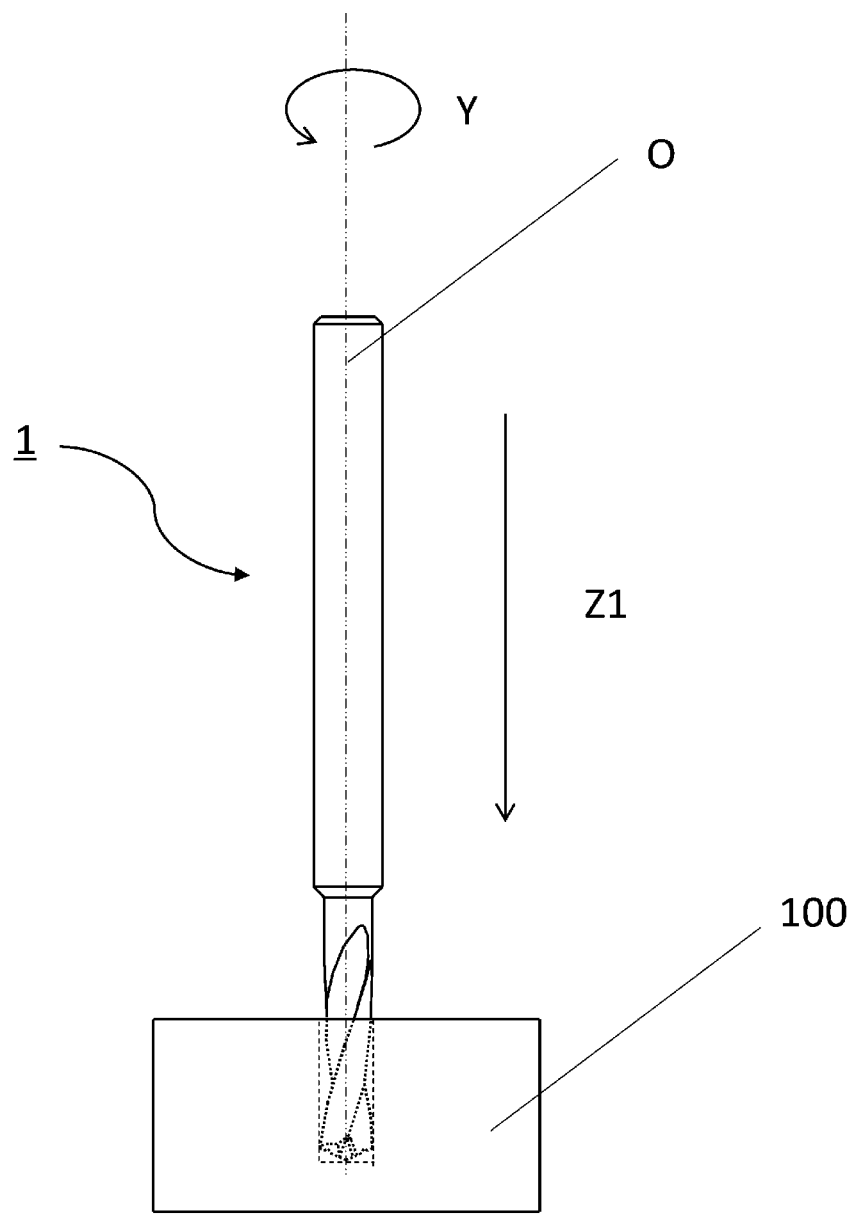
FIG. 19 is a view of a step in a method of manufacturing a machined product of a non-limiting example of the present disclosure.
Figure 20:
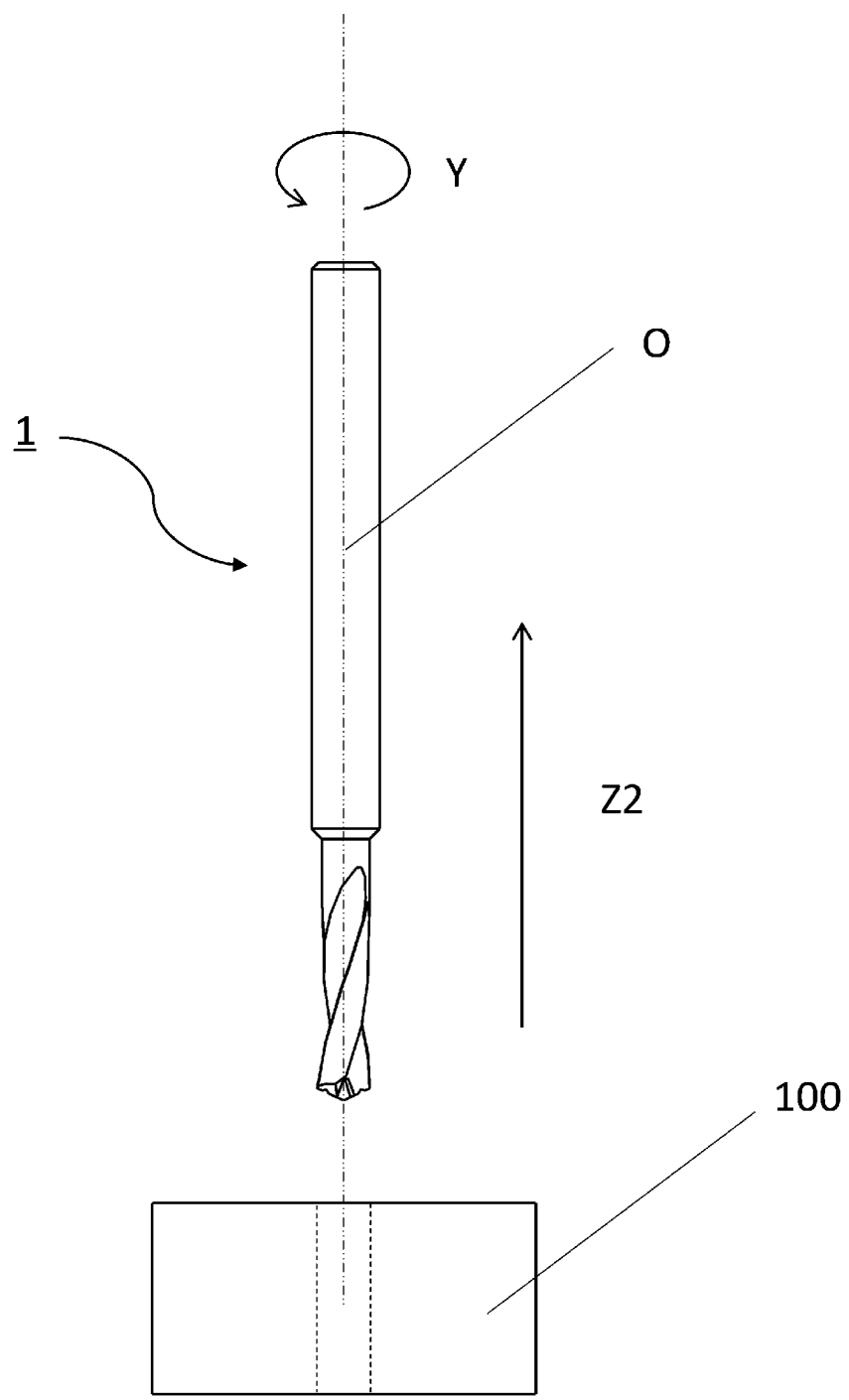
FIG. 20 is a view of a step in a method of manufacturing a machined product of a non-limiting example of the present disclosure.

Next, as illustrated in FIG. 19, the cutting edge of the drill 1 may be brought into contact with the workpiece 100 to machine the workpiece 100. Then, as illustrated in FIG. 20, by moving the drill 1 in a direction Z2, the drill 1 may be relatively moved away from the workpiece 100.

In the non-limiting embodiment, the drill 1 may be brought close to the workpiece 100 in a state where the workpiece 100 is fixed and the drill 1 is rotated around the rotation axis O. Additionally, in FIG. 19, the workpiece 100 may be machined by bringing the cutting edge of the rotating drill 1 into contact with the workpiece 100. In FIG. 20, the drill 1 may be moved away from the workpiece 100 in a rotated state.

In machining using the method of manufacturing according to the non-limiting embodiment of the present disclosure, the drill 1 may be brought into contact with the workpiece 100 or the drill 1 may be separated from the workpiece 100, by moving the drill 1 in each step. Naturally, no such limitation may be intended.

For example, in the step (1), the workpiece 100 may be brought close to the drill 1. Similarly, in step (3), the workpiece 100 may be moved away from the drill 1. In the case of continuing the machining, the step of bringing the cutting edge of the drill 1 into contact with a different portion of the workpiece 100 may be repeated while maintaining the state in which the drill 1 is rotated.

Typical examples of the material of the workpiece 100 may include aluminum, carbon steel, alloy steel, stainless steel, cast iron, and nonferrous metal; or the like.

REFERENCE SIGNS LIST

1 Drill
3 Body
3*a* First end (Front end)
3*b* Second end (Rear end)
5 Machining section
7 Shank section
9 Outer peripheral surface
11 Cutting edge
13 Flute
15 First cutting edge
17 Second cutting edge
19 First part
21 Second part
23 Third part
25 Third cutting edge
27 Peripheral cutting edge
29 Fourth cutting edge
31 Fifth cutting edge
33 Sixth cutting edge
35 First surface
37 Second surface
39 Concave groove portion
41 First portion
43 Second portion
45 Third portion
47 Fourth portion
49 Chisel edge
51 Thinning edge
100 Workpiece
$\theta 1$ First axial rake angle
$\theta 2$ Second axial rake angle
L1 First virtual extended line
L2 Second virtual extended line
L3 Virtual straight line
O Rotation axis
Y Rotating direction
Z1 Machining direction

The invention claimed is:

1. A drill, comprising:
a body having a rod-shape and extending along a rotation axis from a first end toward a second end, wherein
the body comprises:
an outer peripheral surface;
a cutting edge positioned on a side of the first end; and
a flute extending from the cutting edge toward the second end,
the cutting edge comprises:
a first cutting edge extending from a side of the rotation axis toward the outer peripheral surface; and
a second cutting edge positioned closer to the second end and the outer peripheral surface than the first cutting edge,
an end portion of the first cutting edge on a side of the outer peripheral surface is positioned closer to the second end than an end portion of the first cutting edge on the side of the rotation axis,
the second cutting edge comprises:
a first part positioned closest to the second end;
a second part connected to the first part, the second part is positioned closer to the outer peripheral surface than the first part, and positioned closer to the second end as close to the first part; and
a third part connected to the first part, the third part is positioned closer to the first cutting edge than the first part, and the third part is positioned closer to the second end as close to the first part, and
the first part has a concave shape recessed toward the second end in a side view,
the body further comprises a peripheral cutting edge that is positioned at least at a portion of a ridge line at which the outer peripheral surface and the flute intersect and that is connected to the cutting edge,
the cutting edge further comprises a fourth cutting edge connected to the peripheral cutting edge,
the fourth cutting edge comprises: a third portion; and a fourth portion positioned closer to the outer peripheral surface than the third portion, and
a radius of curvature of the third portion is smaller than a radius of curvature of the fourth portion.

2. The drill according to claim 1, wherein the second part is linear.

3. The drill according to claim 1, wherein
the cutting edge further comprises a third cutting edge connected to the first cutting edge and the third part and having a convex shape in the side view.

4. The drill according to claim 1, wherein
in the side view,
the first cutting edge is linear,
a line obtained by extending the first cutting edge toward the outer peripheral surface is defined as a first virtual extended line, and
the fourth cutting edge is positioned closer to the second end than the first virtual extended line.

5. The drill according to claim 1, wherein the fourth cutting edge has a convex curved shape in the side view.

6. The drill according to claim 1, wherein
the cutting edge comprises a fifth cutting edge that is located between the second cutting edge and the outer peripheral surface and that is linear.
7. The drill according to claim 6, wherein
in the side view,
the first cutting edge is linear,
a line obtained by extending the first cutting edge toward the outer peripheral surface is defined as a first virtual extended line, and
an end portion of the fifth cutting edge on the side of the outer peripheral surface is positioned closer to the side of the first end than the first virtual extended line.
8. The drill according to claim 6, wherein
in a front view of the first end,
the first cutting edge is linear,
a line obtained by extending the first cutting edge toward the outer peripheral surface is defined as a second virtual extended line, and
the fifth cutting edge is away from the second virtual extended line.
9. The drill according to claim 8, wherein
the fifth cutting edge is positioned rearward of the second virtual extended line in a rotating direction in the front view of the first end.
10. The drill according to claim 6, wherein
the cutting edge comprises a sixth cutting edge connected to the second part and the fifth cutting edge.
11. The drill according to claim 6, wherein
the cutting edge further comprises a fourth cutting edge connected to the peripheral cutting edge, and
the fourth cutting edge is connected to the fifth cutting edge and the peripheral cutting edge.
12. The drill according to claim 1, wherein the third part has a concave curved shape in the side view.
13. The drill according to claim 1, wherein
the flute comprises:
   a first surface extending from the first part toward the second end; and
   a second surface extending from the second part toward the second end, and
   an axial rake angle on the second surface is smaller than an axial rake angle on the first surface.
14. The drill according to claim 1, wherein
in a front view of the first end,
the body comprises a concave groove portion extending rearward in the rotating direction from the second cutting edge.
15. The drill according to claim 1, wherein
the third part comprises: a first portion; and a second portion positioned closer to the outer peripheral surface than the first portion, and
a radius of curvature of the first portion is larger than a radius of curvature of the second portion.
16. A method of manufacturing a machined product, comprising the steps of:
   rotating the drill according to claim 1;
   bringing the drill that is rotating into contact with a workpiece; and
   separating the drill from the workpiece.
17. A drill, comprising:
a body having a rod-shape and extending along a rotation axis from a first end toward a second end, wherein
the body comprises:
   an outer peripheral surface;
   a cutting edge positioned on a side of the first end; and
   a flute extending from the cutting edge toward the second end,
the cutting edge comprises:
   a first cutting edge extending from a side of the rotation axis toward the outer peripheral surface and being closer to the second end at an end closer to the outer peripheral surface; and
   a second cutting edge positioned closer to the second end and the outer peripheral surface than the first cutting edge and having a concave shape that is recessed toward the second end,
the second cutting edge comprises a first part comprising a portion positioned closest to the second end;
the first part has a concave curved shape recessed toward the second end in a side view,
the body further comprises a peripheral cutting edge that is positioned at least at a portion of a ridge line at which the outer peripheral surface and the flute intersect and that is connected to the cutting edge,
the cutting edge further comprises a third cutting edge connected to the first cutting edge and the third part and having a convex shape in the side view and a fourth cutting edge connected to the peripheral cutting edge,
the fourth cutting edge comprises: a third portion; and a fourth portion positioned closer to the outer peripheral surface than the third portion, and
a radius of curvature of the third portion is smaller than a radius of curvature of the fourth portion.
18. The drill according to claim 17, wherein
the cutting edge comprises a fifth cutting edge that is located between the second cutting edge and the outer peripheral surface and that is linear.
19. The drill according to claim 18, wherein
the first cutting edge is linear,
a line obtained by extending the first cutting edge toward the outer peripheral surface is defined as a second virtual extended line, and
the fifth cutting edge is away from the second virtual extended line in a front view of the first end.
20. The drill according to claim 19, wherein
the fifth cutting edge is positioned rearward of the second virtual extended line in a rotating direction in the front view of the first end.
21. A drill, comprising:
a body having a rod-shape and extending along a rotation axis from a first end toward a second end, wherein
the body comprises:
   an outer peripheral surface;
   a cutting edge positioned on a side of the first end; and
   a flute extending from the cutting edge toward the second end,
the cutting edge comprises:
   a first cutting edge extending from a side of the rotation axis toward the outer peripheral surface; and
   a second cutting edge positioned closer to the second end and the outer peripheral surface than the first cutting edge,
an end portion of the first cutting edge on a side of the outer peripheral surface is positioned closer to the second end than an end portion of the first cutting edge on the side of the rotation axis,
the second cutting edge comprises:
   a first part positioned closest to the second end;
   a second part connected to the first part, positioned closer to the outer peripheral surface than the first part, and positioned closer to the second end as close to the first part; and a third part connected to the first part, positioned closer to the first cutting edge than the first part, and positioned closer to the second end as close to the first part, and the first part has a concave curved shape recessed toward the second end in a side view, the third part comprises: a first portion; and a second portion positioned closer to the outer peripheral surface than the first portion, and a radius of curvature of the first portion is larger than a radius of curvature of the second portion.

* * * * *